United States Patent [19]

Hogan et al.

[11] Patent Number: 5,546,449
[45] Date of Patent: Aug. 13, 1996

[54] SYSTEM AND METHOD FOR CALL CONFERENCING

[75] Inventors: Steven J. Hogan; Kristi T. Feltz; Douglas R. Murdock; Keith E. Smith, all of Cedar Rapids, Iowa

[73] Assignee: LinkUSA Corporation, Cedar Rapids, Iowa

[21] Appl. No.: 487,978

[22] Filed: Jun. 7, 1995

Related U.S. Application Data

[63] Continuation of Ser. No. 257,622, Jun. 8, 1994, Pat. No. 5,483,587.

[51] Int. Cl.⁶ .................................................. H04M 3/56
[52] U.S. Cl. .................. 379/202; 379/201; 379/203; 379/67; 379/158
[58] Field of Search ................................ 379/201, 202, 379/203, 204, 205, 206, 207, 210, 88, 89, 156, 157, 158, 67, 205; 370/62; 348/14, 15, 16

[56] References Cited

U.S. PATENT DOCUMENTS

| | | | |
|---|---|---|---|
| 4,455,455 | 6/1984 | Little | 379/203 |
| 4,475,189 | 10/1984 | Herr et al. | 379/88 |
| 4,540,850 | 9/1985 | Herr et al. | 379/94 |
| 4,544,804 | 10/1985 | Herr et al. | 379/210 |
| 4,577,065 | 3/1986 | Frey et al. | 379/204 |
| 4,635,251 | 1/1987 | Stanley et al. | 379/204 |
| 4,653,045 | 3/1987 | Stanley et al. | 379/203 |
| 4,691,347 | 9/1987 | Stanley et al. | 379/203 |
| 5,136,581 | 8/1992 | Muehrcke et al. | 379/206 |
| 5,195,086 | 3/1993 | Blaumgartner | 379/202 |
| 5,383,184 | 1/1995 | Champion | 379/202 |
| 5,408,518 | 4/1995 | Yunoki | 379/202 |
| 5,408,526 | 4/1995 | McFarland et al. | 379/202 |
| 5,440,624 | 8/1995 | Schoof, II | 379/202 |

*Primary Examiner*—Jeffery Hofsass
*Assistant Examiner*—Scott Wolinsky
*Attorney, Agent, or Firm*—Sterne, Kessler, Goldstein & Fox P.L.L.C.

[57] ABSTRACT

A call conferencing system and method includes a conference call controller and a conference bridge. The conference bridge includes a plurality of conference ports, to which conference participant audio is connected. Connection of conference ports in the bridge, bridges together the audio of the participants, thus forming the conference. The call conferencing system receives the initial scheduling request for the conference call, checks resource availability for the scheduled conference date and time, and reserves the required resources for the conference if they are available. To create the conference, conference call controller causes an operator console to be tied to a conference port on the bridge. Conference call controller originates a call to a conference participant via a conference port and ties the participant to the console via the bridge. The console informs the participant of the conference and the conference call controller connects the participant to the conference.

46 Claims, 32 Drawing Sheets

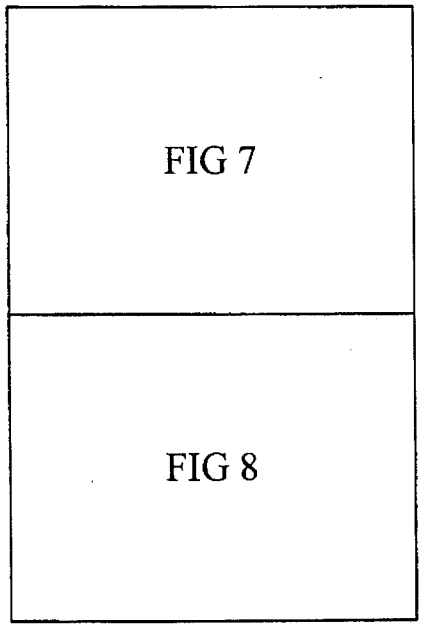
FIG 7
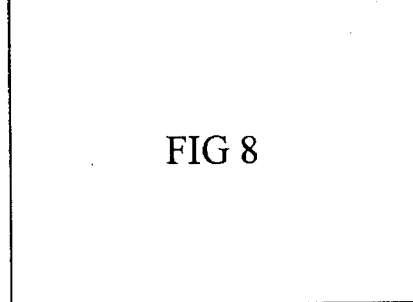
FIG 8
FIG 6

SYSTEM AND METHOD FOR CALL CONFERENCING

This application is a continuation of application Ser. No. 08/257,622, filed Jun. 8, 1994, which was issued on Jan. 9, 1996 as U.S. Pat. No. 5,483,587.

BACKGROUND OF THE INVENTION

1. Field of the Invention

The present invention relates generally to call processing systems, and more specifically, to a system and method for providing conference call features.

2. Related Art

Conference call capabilities are widely used in today's business and industry. Such capabilities allow a party to set up a telephone call in which numerous parties can participate in a meeting or conference via telephone. Through the use of conference calling, meetings between various parties at various distant locations are routinely conducted without the need to expend time and money to travel to the meeting location.

In some offices, telephones are provided with the ability to set up a conference call. In such an office, the party setting up the conference calls each of the conference participants, one at a time. As each participant is called, he or she is added to the conference. When all participants have been called, the conference call can begin. In other environments, an operator dedicated to handling conference calling functions is provided to set up the conference call. In such an environment, the operator contacts each conference participant to set up the conference call.

SUMMARY OF THE INVENTION

The present invention is directed toward a system and method for providing call conferencing features with a call processing system. According to the invention, a conference call controller is provided to control setup, origination and termination of the conference call. The conference participants are tied together on the conference call using a conference bridge. The conference bridge comprises a plurality of conference ports. The conference participants are connected to the conference ports and the conference ports are connected together to form the conference within the conference bridge.

A user wishing to set up a conference call places a call to his or her carrier which is supported by the call processing system. An operator console elicits preliminary information from the caller pertaining to the date, time, anticipated duration, and number of participants for the conference. The operator console forwards this information to the conference call controller which checks on the availability of those resources for the scheduled time. If available, the resources are reserved and the conference call controller informs the operator console that the conference is scheduled.

The operator console then elicits specific information about the participants such as their names, their phone numbers and billing information for each leg of the conference call. This information is forwarded to the conference call controller where it is stored in a participant database.

When it is time for the conference to begin, the conference call controller requests allocation of an operator console. The operator console is connected to a first conference port on the bridge. The conference call controller retrieves the participant information from the participant database. Using this information, the conference call controller originates a call to a first conference participant via a second conference port on the bridge. When the call is completed, the first and second conference ports are connected in the bridge. The conference call controller provides the operator console with participant information so the operator can query the participant as to his or her desire to participate.

Each of the other conference participants is contacted in a similar fashion. As each conference participant is originated and indicates a desire to participate, that participant's conference port is connected to the other conference participants within the conference bridge.

One advantage of the invention is that multiple operator consoles can be allocated to the conference call during the setup phase. In this manner, two or more conference participants can be simultaneously contacted to minimize setup time. Because the conference call controller controls the setup and origination, the integrity of the call control mechanism can be maintained while gaining the ability to speed call setup time.

Another advantage of the invention is that conference call controller handles the responsibilities of verifying and allocating resources, conference scheduling, and originating the call to each of the conference participants. As a result, the operator console is available to perform other functions. Another advantage resulting from conference call controller handling such responsibilities is that dedicated conference call operators with special capabilities are not required to handle conference calls.

Yet another advantage of the invention is that it interfaces to a call processing system having a switch-independent platform such as the network control processor. As a result, conference features and functions can be customized to accommodate specific user or client needs. Customized services can be provided with minimal development effort-usually just a database change-and without additional hardware expenditures.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 6, which comprises

FIG. 7 is a high-level operational flow diagram illustrating the process that call processing system uses to process operator-assisted calls.

FIG. 8, which is a continuation of FIG. 7, is a high-level operational flow diagram illustrating the process that call processing system uses to process operator-assisted calls.

FIG. 14, which comprises

FIG. 15 is a flowchart illustrating the steps associated with allocation and scheduling a conference call according to one embodiment of the invention.

FIG. 16, which is a continuation of FIG. 15, illustrates the steps associated with allocation and scheduling a conference call according to one embodiment of the invention.

DETAILED DESCRIPTION OF THE EMBODIMENTS 1.0 Introduction and High-Level Overview
1.1 Standard Call Processing System
1.2 Enhanced Call Processing System
2.0 Conference Call Controller
2.1 Conference Call Allocation
2.2 Conference Call Setup
2.3 Operator Assistance
2.4 Conference Call Completion Phase
3.0 Conclusion 1.0 Introduction and High-Level Overview According to one embodiment of the invention, the conference call controller operates in the environment of a call processing system. In order to provide the reader with a more complete understanding of the invention, two call processing systems are first described. In Section 1.1 a standard call processing system is described. Section 1.2 describes an enhanced call processing system that utilizes a network control processor 304 to provide enhanced call processing features. In subsequent sections of this document, the conference call controller 904 (illustrated in FIG. 9) is described in an embodiment wherein it is operational in the environment of the enhanced call processing system described in Section 1.2. A more detailed description of this enhanced call processing system 302 can be found in co-pending patent application of common assignee, Ser. No. 08/136,211, filed on Oct. 15, 1993, the entire text of which is incorporated herein by reference.

1.1 Standard Call Processing System

Figure 1:
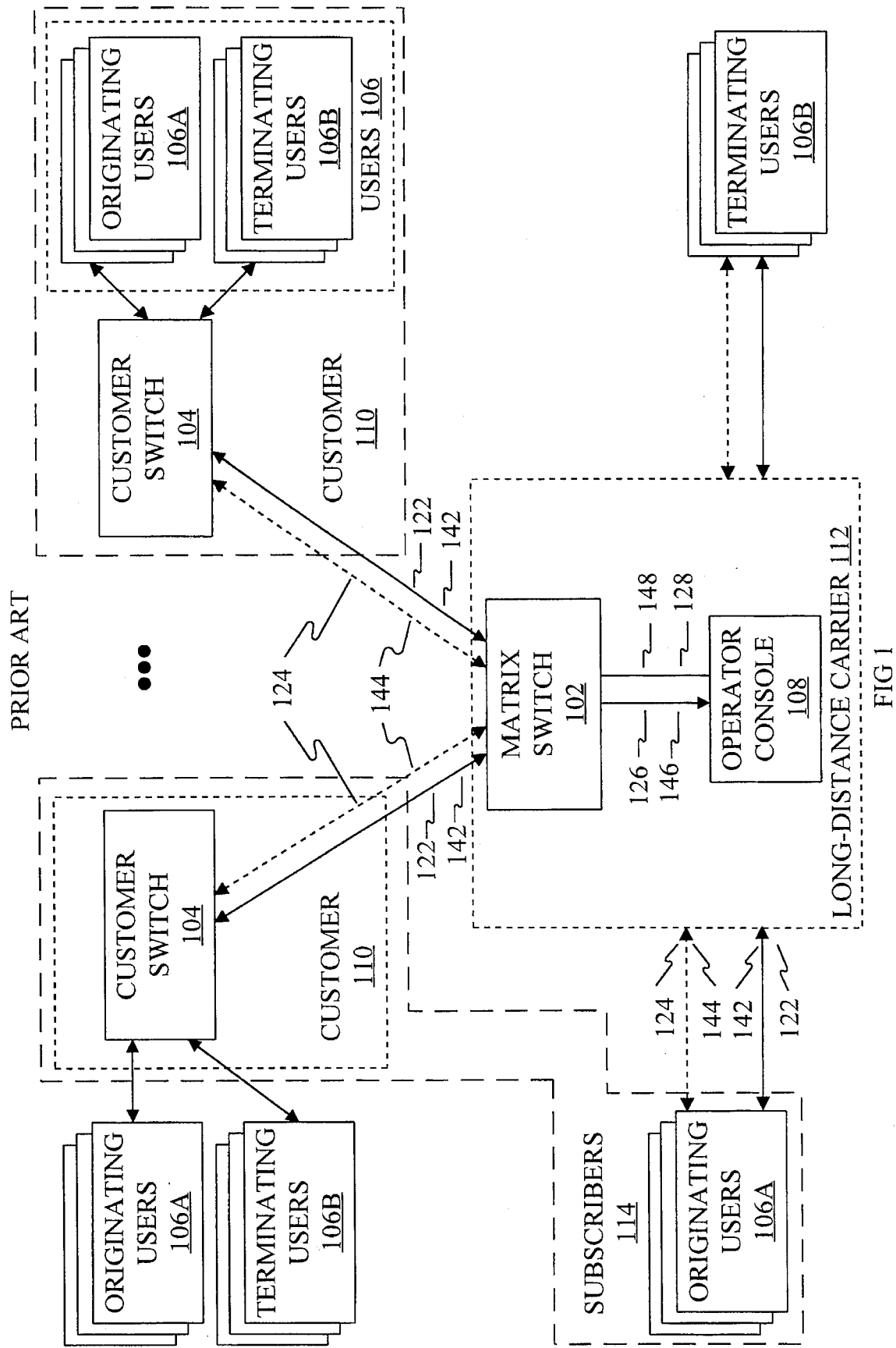
FIG. 1 is a high-level block diagram illustrating the architecture of a conventional telephone switching configuration.

An example of a standard telephone switching configuration is illustrated in FIG. 1. FIG. 1 is a high-level block diagram illustrating the architecture of a conventional telephone switching configuration. Referring now to FIG. 1, the configuration includes a matrix switch 102 and an operator console 108. A typical subscriber 114 to a long-distance carrier 112 may be a business, another carrier, or an individual user 106. Customer 110 may, for example, be a business or it may be a carrier that is procuring enhanced services from a competitor long-distance carrier 112. Customer 110 may have its own customer switch 104 for routing calls between outside trunks and inside lines or instruments.

Users 106 (for example, humans talking on the telephone) place long-distance calls using long-distance carrier 112. The user 106 who places the call (calling party) is termed an originating user 106A. The user 106 to whom the call is placed (called party) is termed a terminating user 106B.

Originating user 106A may place the call directly with long-distance carrier 112 where originating user 106A is a customer of long-distance carrier 112. Where originating user 106A subscribes to another carrier that is a customer 110 of long-distance carrier 112, the call is routed through customer 110. Where originating user 106A is an end-user at a business that is a customer 110 of long-distance carrier 112 and that has its own switch 104, that originating user's call also gets routed through customer switch 104. In the latter two cases, originating user 106A is deemed a "client" of customer 110.

Matrix switch 102 is provided as a switch to route calls between users 106. A call is routed from originating user 106A to terminating user 106B. Matrix switch 102 typically can route thousands of telephone calls simultaneously. An example of matrix switch 102 is the commercially-available switch model DMS 250, manufactured by Northern Telecom, Inc. in Richardson, Tex., U.S.A. "DMS" is a registered trademark of Northern Telecom, Inc.

Figure 2:
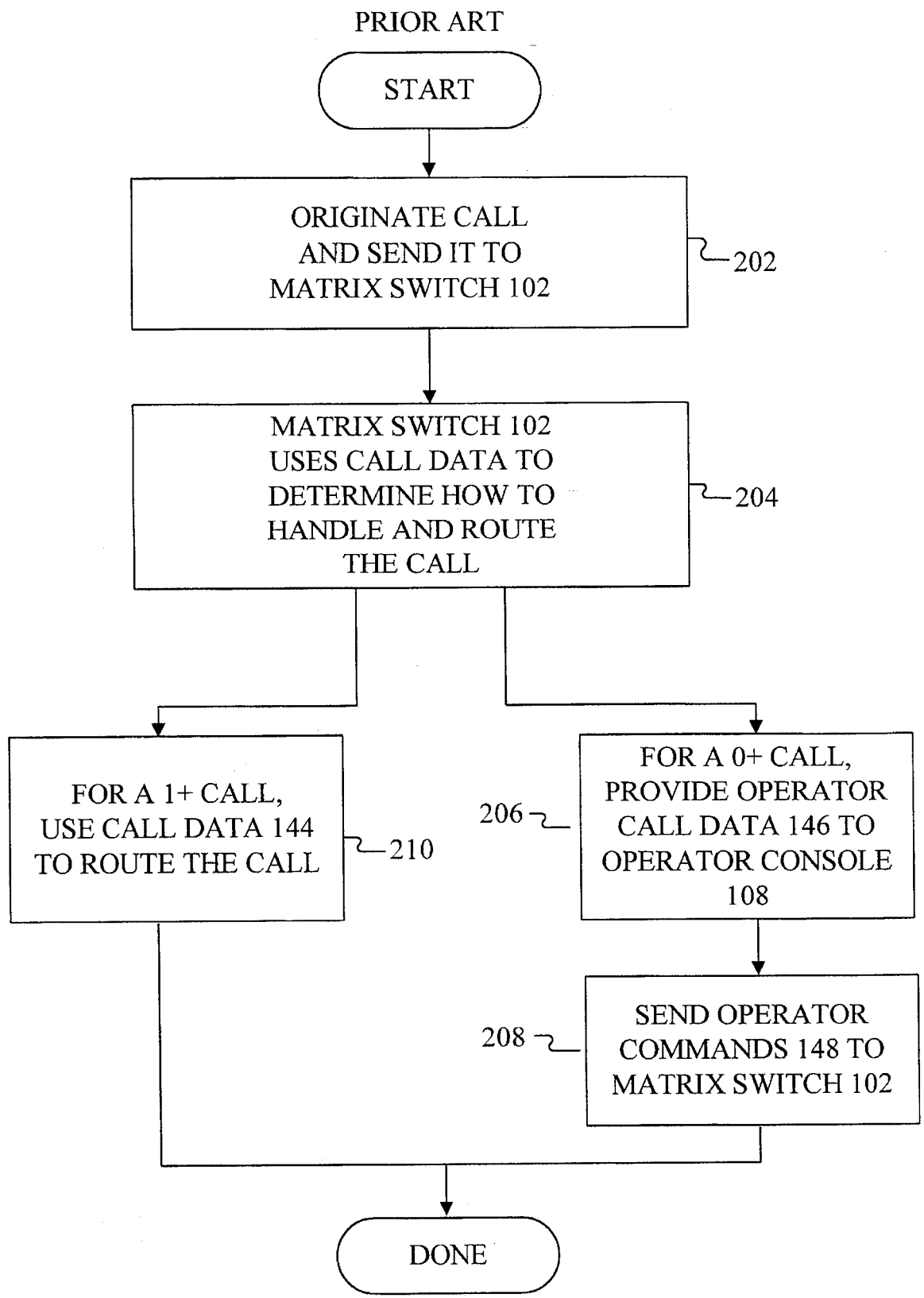
FIG. 2 is a high-level operational flow diagram illustrating the manner in which the long-distance carrier provides long-distance telephone services to its subscribers.

The manner in which long-distance carrier 112 provides long-distance services is now described. FIG. 2 is a high-level operational flow diagram illustrating the manner in which long-distance carrier 112 provides long-distance telephone services to its subscribers 114. FIGS. 1 and 2 are now referred to in order to illustrate how long-distance carrier 112 provides direct-dial long-distance service and operator-assisted calling for users 106. Long-distance direct dialing is accomplished by dialing one plus (1+) the called number. Operator-assisted calling can be placed by dialing zero plus (0+) the called number or by simply dialing zero (0).

The long-distance call is originated by user 106 and sent to matrix switch 102. This occurs in a step 202. The call is sent over two channels. These channels are an audio channel 122 and a signalling channel 124. Audio channel 122 carries the audio portion of the call. The audio portion of the call is referred to as call audio 142. It is over audio channel 122 that the caller's voice (in other' words, call audio 142) can be heard. Call audio 142 can be analog audio, digital audio, or other information (for example, fax or modem signals) transferred among users 106.

Signalling channel 124 is used to transmit call data 144. Call data 144 includes information regarding the type of telephone call being made and other call handling parameters including called number, originating number (e.g., an automatic number identification, or ANI), how the call was dialed (1+, 0+, 0), and the like. Call data 144 also provides call setup parameters to matrix switch 102.

An example of a signalling channel 124 is the industry standard common channel signalling system 7 (SS7) out-of-band signalling channel. SS7 is typically a 56 kilobit (kbit) link, and is commonly transmitted over a T-1 carrier. Typically, call data 144 is a data packet comprising 30–40 bytes of data.

Matrix switch 102 accepts call data 144 to determine how to handle and route the call. This occurs in a step 204.

If the call requires operator assistance (for example, a collect call), operator call data 146 is provided to an operator console 108. This occurs in a step 206. Typically, operator call data 146 is transferred to operator console 108 over a data link 126. Operator call data 146 includes information regarding the type of call and other information which matrix switch 102 knows regarding the call such as originating number, how the call was dialed, and the like.

Operator console 108 is typically a manual operator console which requires a human operator. The human operator answers the incoming call. The human operator then sends operator commands 128 to matrix switch 102 to complete the call. In the case of a collect call this allows the operator to verify that the called party will accept the charges for the call. This occurs in a step 208.

If the call was instead a direct-dial call, matrix switch 102 uses call data 144 provided over signalling channel 124 to determine where to route the call. Matrix switch 102 then routes the call to the destination number. This occurs in a step 210.

There are a few drawbacks associated with this system used by the conventional long distance carrier. First, data link 126 over which operator call data 146 are transferred is often slower than desired and introduces unwanted delays in handling the call.

A second drawback is that the human operator at operator console 108 only gets the information that matrix switch 102 decides to send. In other words, call handling is limited to the features and capabilities that are provided by the particular matrix switch 102 that was purchased by the carrier.

Note, other manufacturers may provide matrix switches 102 with different features from those of the DMS 250. For example, other switches 102 may have a higher data rate link 126. However, long-distance carrier 112 is still limited to the choices of matrix switches 102 that are commercially available, because it would be prohibitively expensive to design, develop and manufacture a custom matrix 102. Thus, the functionality and capabilities that can be provided by a long distance carrier in this conventional system are limited to the functionality and characteristics provided by available matrix switches 102.

Because matrix switches 102 are costly to develop, they are typically designed to provide only those basic functions that all long-distance carriers are likely to desire. In this manner, the development costs of matrix switch 102 can be spread among numerous long-distance carriers. The cost of developing and manufacturing a unique matrix switch 102 is too high to provide a custom switch for a single long-distance carrier, or for only a small group of long-distance carriers. As a result, customer-unique and carrier-unique calling ligatures and services cannot be provided.

Additionally, most manufacturers of matrix switches 102 are unable to modify existing matrix switches 102 to meet unique needs of the various long-distance carriers without a significant cost and significant time to implement.

An additional drawback is that it is typically expensive to provide operator positions to interface to matrix switch 102. This is because operator consoles can only interface to conventional matrix switches 102 via special operator ports. Most conventional matrix switches provide a limited number of such operator ports. For example, the DMS 250 matrix switch 102 provides a capability of 384 operator console ports per switch. Thus, in this example, if more than 384 operator consoles 108 are desired, at least one additional DMS 250 matrix switch must be purchased. At a cost of approximately $2 million per DMS 250 (1993 prices), the cost of additional operator positions is high.

Due to the high cost of available matrix switches 102, most, if not all, of the smaller long-distance carriers cannot afford to purchase or develop custom telecommunications switching equipment. As a result, these carriers cannot have their own operator positions. Therefore, these carriers must obtain high-end services such as operator-assisted calling through carriers 112 who have such capabilities.

Additionally, for those long-distance carriers who do have matrix switches 102, such switches 102 cannot be easily (or cost-effectively) reconfigured, or customized, to meet unique call processing needs. Thus, the flexibility required to offer a wide range of customer services and call handling capabilities cannot be provided to the customers and users of these call processing systems 112.

1.2 Enhanced Call Processing System

Figure 3:
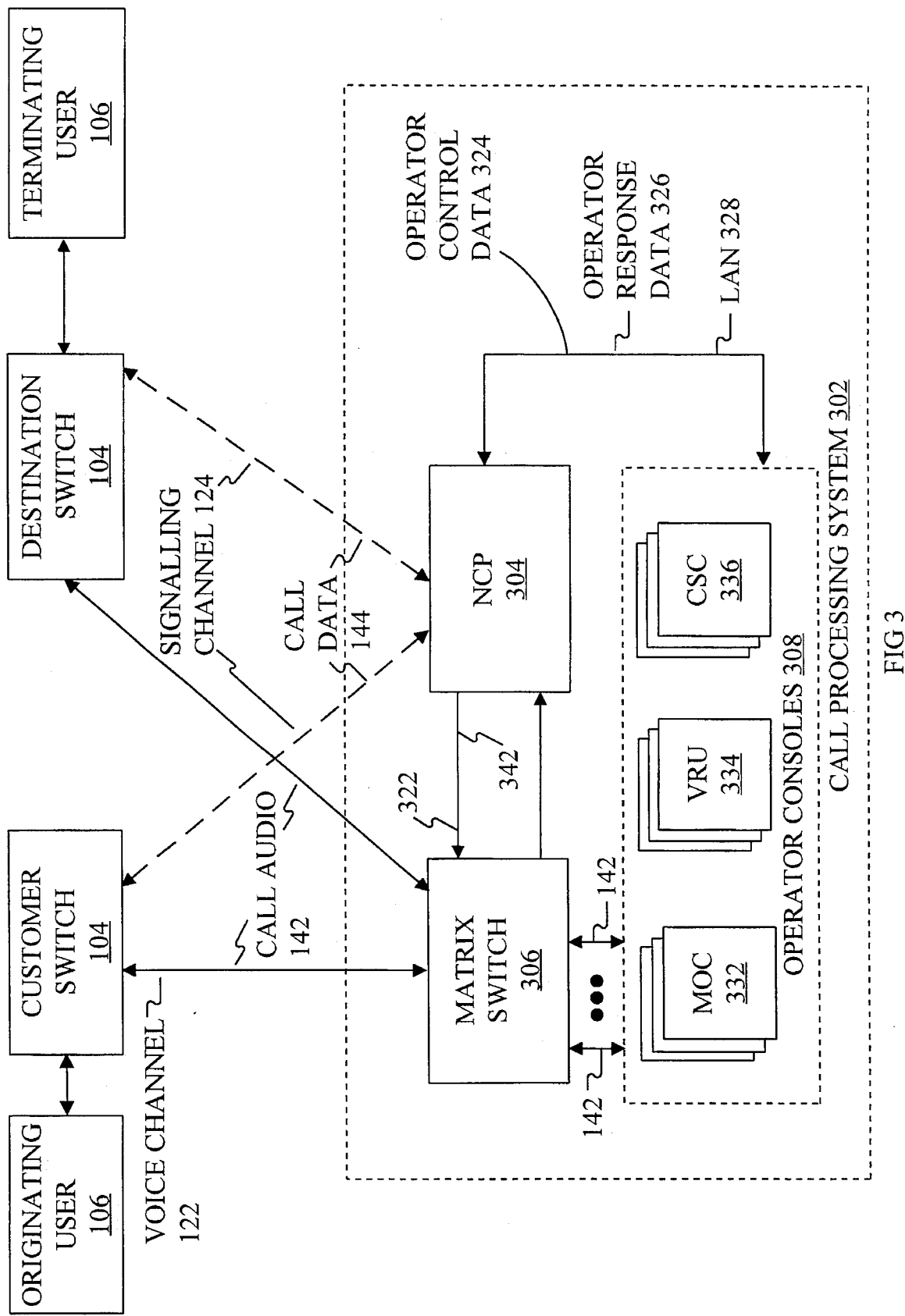
FIG. 3 is a block diagram illustrating an enhanced call processing system.

FIG. 3 is a block diagram illustrating an enhanced call processing system. Enhanced call processing system 302 provides a wide range of enhanced calling products and features to carriers and individual users. One or more carriers can use call processing system 302 to obtain carrier-unique and customer-unique, customized products and features for their customers.

Call processing system 302 includes a network control processor (NCP) 304 and a matrix switch 306. Matrix switch 306 could be the same as matrix switch 102 (for example, a DMS 250). Alternatively, matrix switch 306 could be a simpler type of switch as will be described below. Network control processor 304 is a unique combination of hardware, software structure and programs designed and developed to control calls being handled by call processing system 302.

Call processing system 302 can also include one or more operator consoles 308. Operator console 308 can be the same as operator console 108 used in the conventional system. However, in a preferred embodiment, operator consoles 308 provide additional features not found in conventional operator consoles 108. For example, operator consoles 308 provide the capability to use customized scripts to present a carrier-unique interface. Scripts and other features of operator consoles 308 are discussed throughout this document.

Types of operator consoles 308 can include a manual operator console (MOC) 332 and an automated voice response unit (VRU) 334. Manual operator console 332 provides the functionality required for a human operator to converse with the caller. Automated voice response unit 334 does not require a human operator to handle operator-assisted calls. Automated voice response unit 334 includes stored voice or synthesized voice responses (automated scripts) to provide automated voice instructions to the caller. For example, automated voice response unit 334 may instruct a caller 106A (originating user) to enter her calling card number.

An additional type of operator console 308 includes a customer service console 336. Customer service console 336 performs customer service related functions. These functions include giving credits for call problems and answering questions of users 106 and long-distance carrier customers of call-processing system 302.

When a call is originated by originating user 106A, call audio 142 and call data 144 for the call are routed to call processing system 302. A key feature of call processing system 302 is that it enables call audio 142 on audio channel 122 to be handled separately from call data 144.

Figure 4:
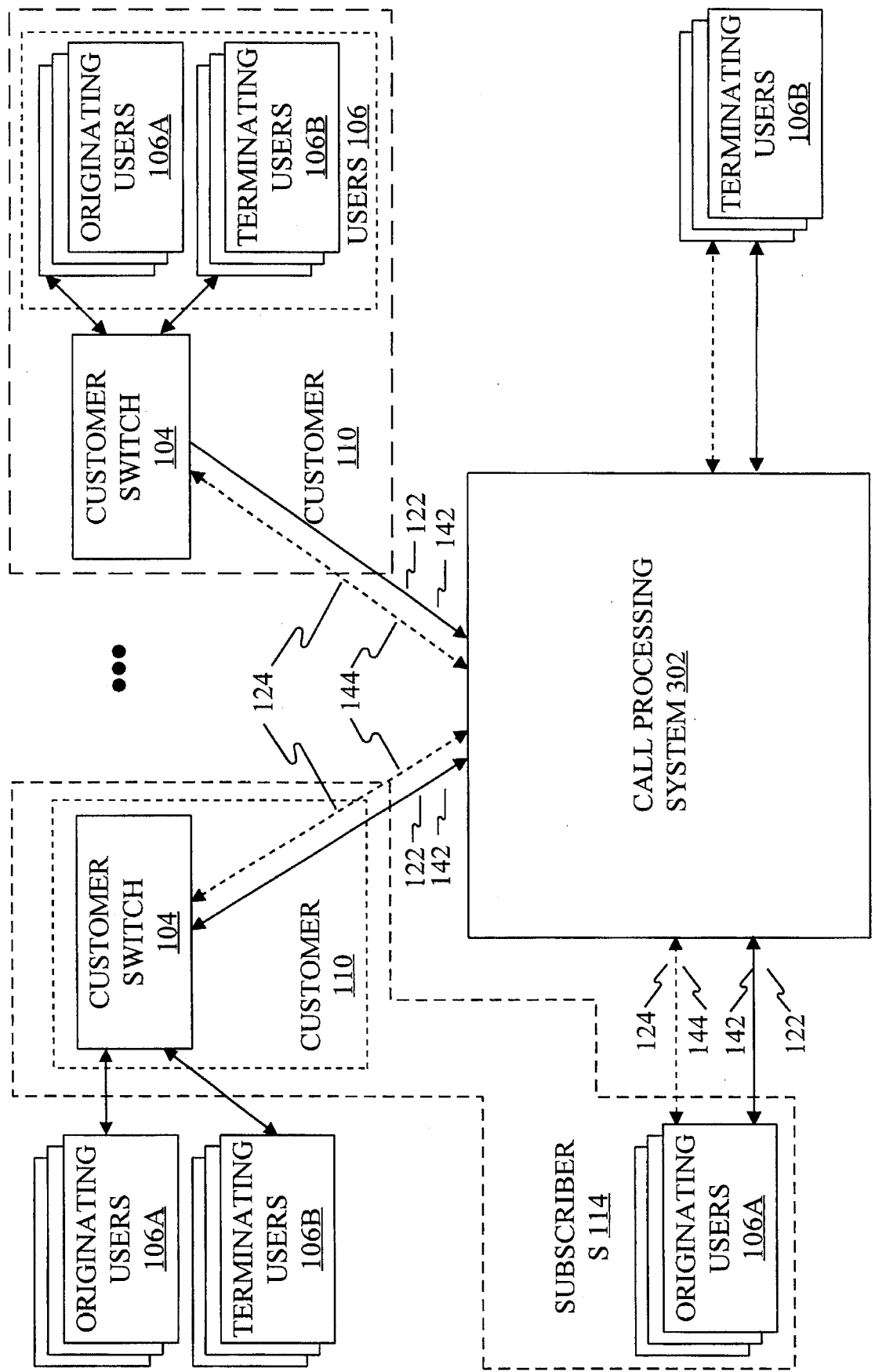
FIG. 4 is a block diagram illustrating a relationship between customers and subscribers of the call processing system.

FIG. 4 is a block diagram illustrating a relationship between customers and subscribers of the call processing system. Originating user 106A can be a client of a customer 110 of call processing system 302, or a direct subscriber 114 of call processing system 302. Customer 110 can be a business or a carrier procuring enhanced services from call processing system 302. Originating user 106A may place a call directly to call processing system 302 or through customer switch 104. The detail of customer 110 and users 106 is illustrated separately in FIG. 4 for clarity. The term subscriber 114 is used to generally refer to users 106 who are direct clients of call processing system 302 and/or to customers 110.

Calls are placed to terminating users 106B. Terminating users 106B may be subscribers 114, clients of customers 110, or any other destination to which a call is placed.

Network control processor 304 receives call data 144 via signalling channel 124. Network control processor 304 uses call data 144 to make call handling decisions. Examples of these decisions include whether operator assistance is required, whether a number translation is required, how to bill the call, where the call should be routed, and the like. Also, when the call is originated, matrix switch 306 receives call audio 142 from the user 106 who placed the call.

Network control processor 304 then sends switch control data 322 to matrix switch 306. Switch control data 322 include data that controls call muting in matrix switch 306. For calls requiring operator assistance, network control processor 304 sends operator control data 324 to operator console 308. Operator control data 324 includes information on how to handle the operator-assisted call.

Figure 5:
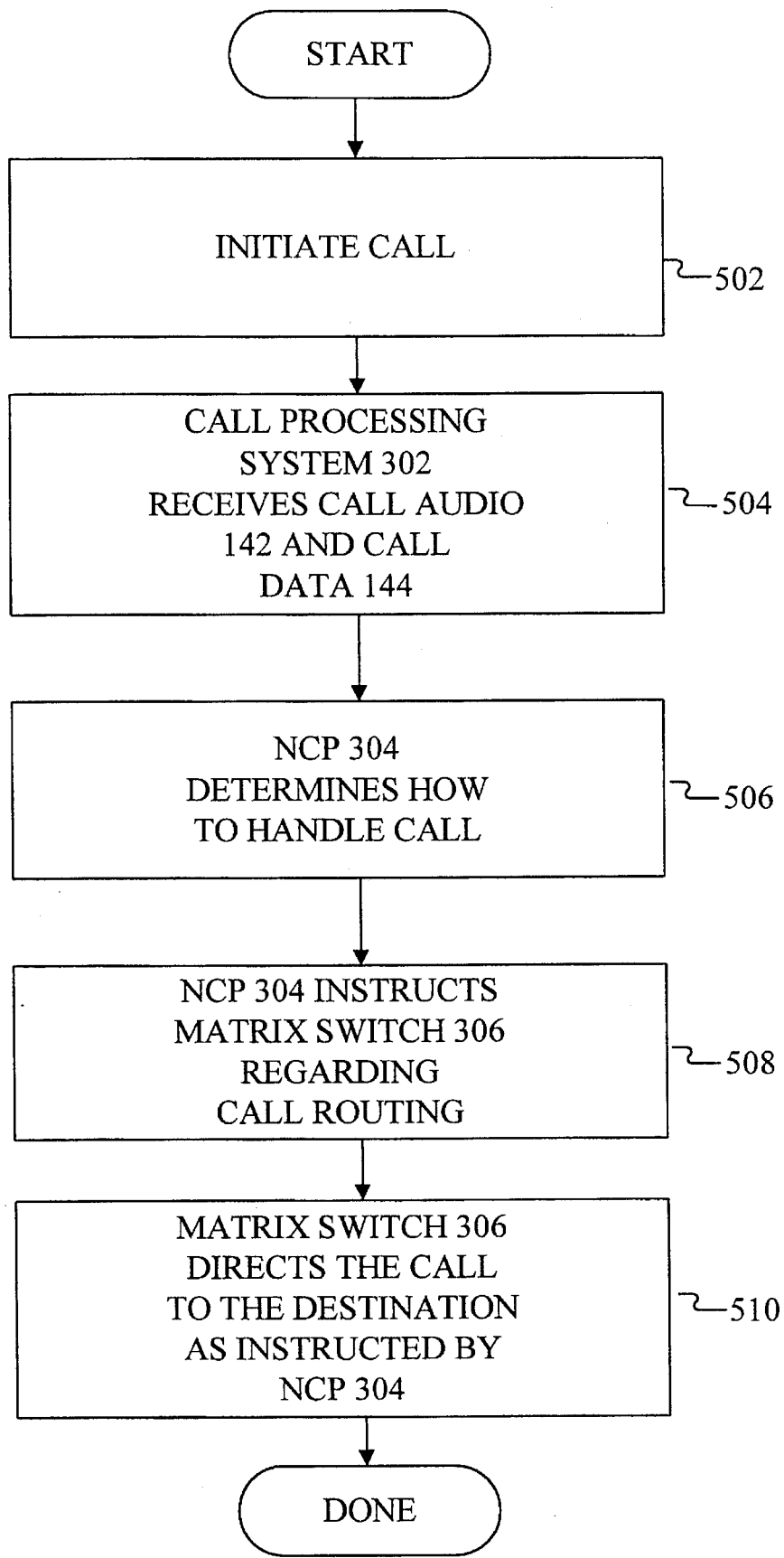
FIG. 5 is an operational flow diagram illustrating the steps involved in placing and completing a call using call processing system.

Call processing system 302 is best described in conjunction with an example illustrating how calls are handled. FIG. 5 is an operational flow diagram illustrating the steps involved in placing and completing a call using call processing system 302. Referring to FIGS. 3, 4 and 5, these steps are now described.

In a step 502, an originating user 106A initiates a call. In other words, a caller picks up the telephone and dials a telephone number of a called party (terminating user 106B). Examples of user 106 can include a human communicating via a telephone instrument, a fax machine, or a modem. The only difference is that originating user 106A originates the telephone call, while terminating user 106B is the user to whom the call is placed.

The call can be routed directly to network control processor 304, or it could be routed to network control processor 304 via customer switch 104. In the latter case, customer switch 104 forwards call audio 142 and call data 144 associated with this call to call processing system 302. If a customer switch 104 is not in place, call audio 142 goes directly to matrix switch 306 at call processing system 302 and call data 144 to network control processor 304.

In a step 504, call processing system 302 receives call audio 142 and call data 144 for the call initiated in step 502. More specifically, matrix switch 306 receives call audio.142, and network control processor 304 receives call data 144.

In a step 506, network control processor 304 uses call data 144 to determine how to handle the call. Specific details regarding the manner in which network control processor 304 makes this determination are fully described in detail in the network control processor section of this patent document.

In a step 508, network control processor 304 sends switch control data 322 to matrix switch 306. Switch control data 322 commands matrix switch 306 to route the call to the correct destination. For example, switch control data 322 may command matrix switch 306 to route the call audio 142 to customer switch 104 at the terminating end and ultimately to terminating user 106B.

Network control processor 304 commands matrix switch 306 by sending switch control data 322 to matrix switch 306. The format and content of switch control data 322 depends on the type of matrix switch 306 utilized. Note that in some cases, depending on the customer, a customer switch 104 at the terminating end may not be used. In these cases, the call is routed directly to terminating user 106B.

In a step 510, matrix switch 306 routes the call to terminating user 106B as instructed by network control processor 304 in step 508.

As a result of the functionality provided by network control processor 304, matrix switch 306 no longer controls the call as was the case with matrix switch 102 in the conventional system. Matrix switch 306 now simply functions as a passive switch that is reconfigured based on switch control information 322 sent by network control processor 304.

Network control processor 304 receives all the call data 144 associated with the telephone call. There is no filtering or screening performed before data 144 is received by network control processor 304. Call data 144 can include, among other call attributes, the originating number, the called number, and the route or circuits activated in customer switch 104. Thus, full control of the call and all its call audio 142 and call data 144 can be provided by call processing system 302.

Figure 7:
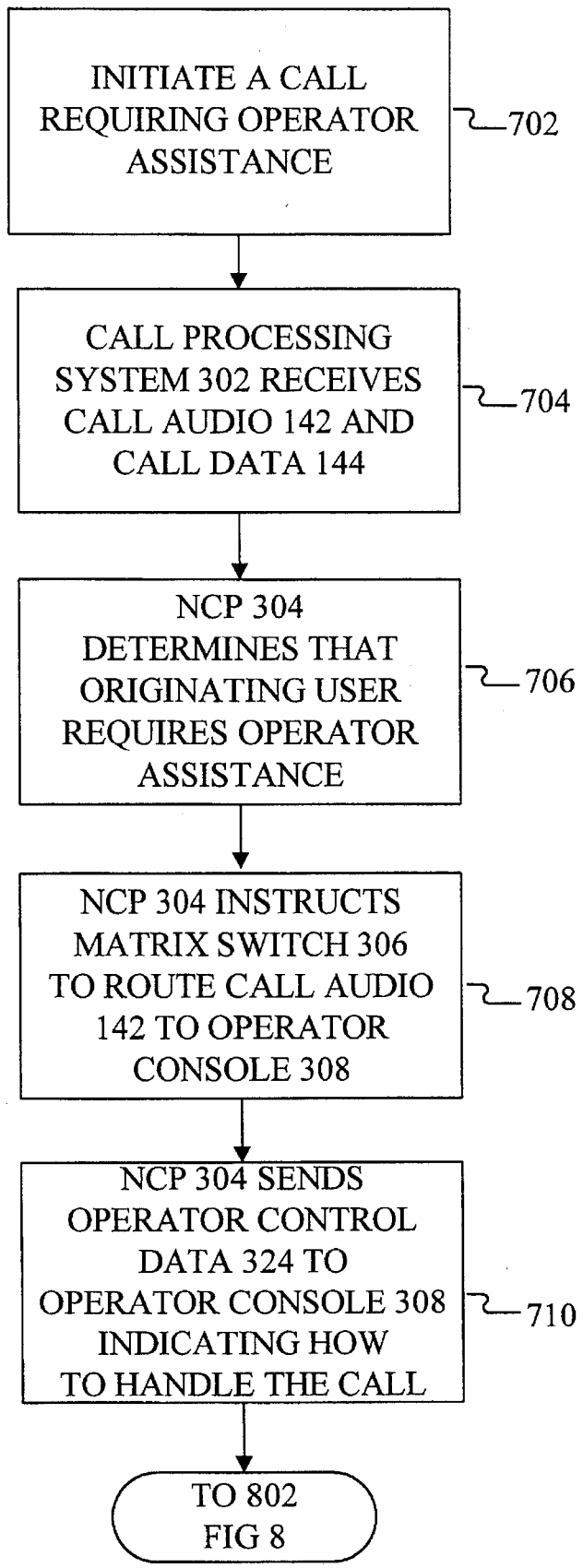
FIGS. 7 and 8, is a high-level operational flow diagram illustrating the process that call processing system uses to process operator-assisted calls.
Figure 8:
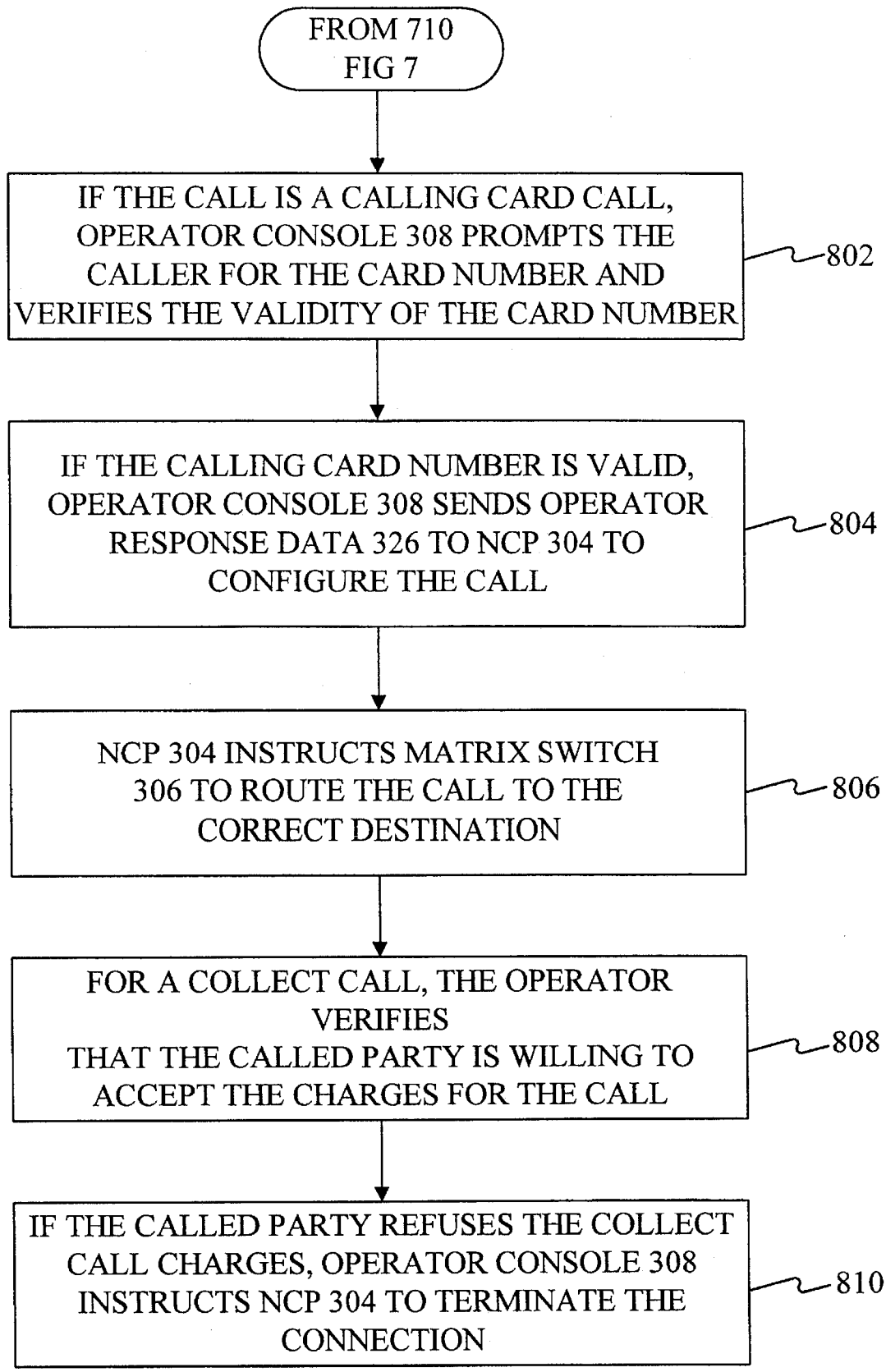

A further high-level illustration of the functionality of call processing system 302 is now described with reference to the following example. In this example, an originating user 106A (FIG. 4) initiates a call requiring operator assistance. FIG. 6, which comprises FIGS. 7 and 8, is a high-level operational flow diagram illustrating the process that call processing system 302 uses to process operator-assisted calls. Referring now to FIGS. 3, 4, 7, and 8, originating user 106A initiates an operator assisted call as shown in a step 702.

In a step 704, call processing system 302 receives call audio 142 and call data 144. More specifically, matrix switch 306 receives call audio 142 and network control processor 304 receives call data 144.

In a step 706, network control processor 304 interprets call data 144 and determines that originating user 106 originated a call requiring operator assistance. For example, in one embodiment, network control processor 304 could examine the called number and determine that because the first number dialed is zero, the caller is requesting operator assistance.

In a step 708, network control processor 304 instructs matrix switch 306 to route call audio 142 to an operator console 308. If a human operator is not required, call audio 142 can be routed to an automated operator console (for example, an automated voice response unit 334). In this case, the voice response unit 334 instructs the caller on how to proceed. These instructions are typically telephone keypad button sequences to be pressed by the caller to complete the call. An example of this is where voice response unit 334 instructs the caller to enter a calling card number.

If a human operator is required to handle the call, the call audio 142 is routed to a manual operator console 332. In this case, the caller can converse with the operator. An example of this situation is where the caller is placing a collect call.

Where matrix switch is a DMS 250, network control processor 304 simply instructs the DMS 250 to route the call to the console position assigned to operator console 308. Because operator console 308 only gets call audio 142, operator console 308 is treated as any other destination and can be identified by a terminating number.

In a step 710, network control processor 304 routes operator control data 324 to operator console 308 via a LAN 328. Operator control data 324 instructs operator console 308 regarding the handling of the call. Operator control data 324 is determined by network control processor 304 when network control processor 304 receives call data 144.

There is a key distinction between call processing system 302 and the conventional system illustrated in FIG. 1. With the conventional system, special operator console ports are required to allow an operator console 108 to interface to matrix switch 102. This is because control information had to be provided by matrix switch 102 to operator console 108.

However, according to call processing system 302, matrix switch 306 only has to transfer call audio 142 to operator console 308. The control information is provided by network control processor 304 in the form of operator control data 324. Operator console 308 only gets call audio 142 from matrix switch 306. Therefore, operator console 308 can be treated as if it is any other terminating user 106B or customer switch 104. Thus, operator console 308 does not have to interface to matrix switch 306 via a special operator console port. Therefore, the number of operator consoles 308 that can interface to matrix switch 306 is not limited to the number of operator console ports available on matrix switch 306.

Operator console 308 now has a connection with audio channel 122. As noted above, operator console 308 can be either a manual operator console 332 for a human operator, or an automated voice response unit 334.

If originating user 106A is placing a calling card call, originating user 106A is prompted by operator console 308 to enter the calling card number. The number is received and verified to ensure that it is a valid number. If the number is invalid, the user is informed that the call cannot be completed. This occurs in a step 802 (illustrated in FIG. 8).

For valid calling card numbers and for collect calls, operator console 308 initiates the connection to the terminating user 106. This occurs as described in steps 804–808 as follows.

In a step 804, operator console 308 sends operator response data 326 to network control processor 304 via LAN 328 indicating that the call can be placed as requested. In response, network control processor 304 sends switch control data 322 to configure matrix switch 306. This tells matrix switch 306 how to route the call. This occurs in a step 806.

In a step 808, matrix switch 306 is reconfigured to direct the call to the destination as instructed by network control processor 304.

For a collect call, the operator asks the called party whether they are willing to accept the charges. This occurs in a step 808.

If the called party is not willing to accept the charges, operator console 308 sends operator response data 326 to network control processor 304 indicating that the call should be terminated. This occurs in a step 810.

It should be understood that the two examples of placing a collect call and a calling card call are offered as examples only. These examples should not be interpreted to imply that the call processing system 302 is limited to only these types of capabilities.

2.0 Conference Call Controller

In a preferred embodiment, the conference call controller is implemented in the environment of the enhanced call processing system described in Section 1.2 above.

Figure 9:
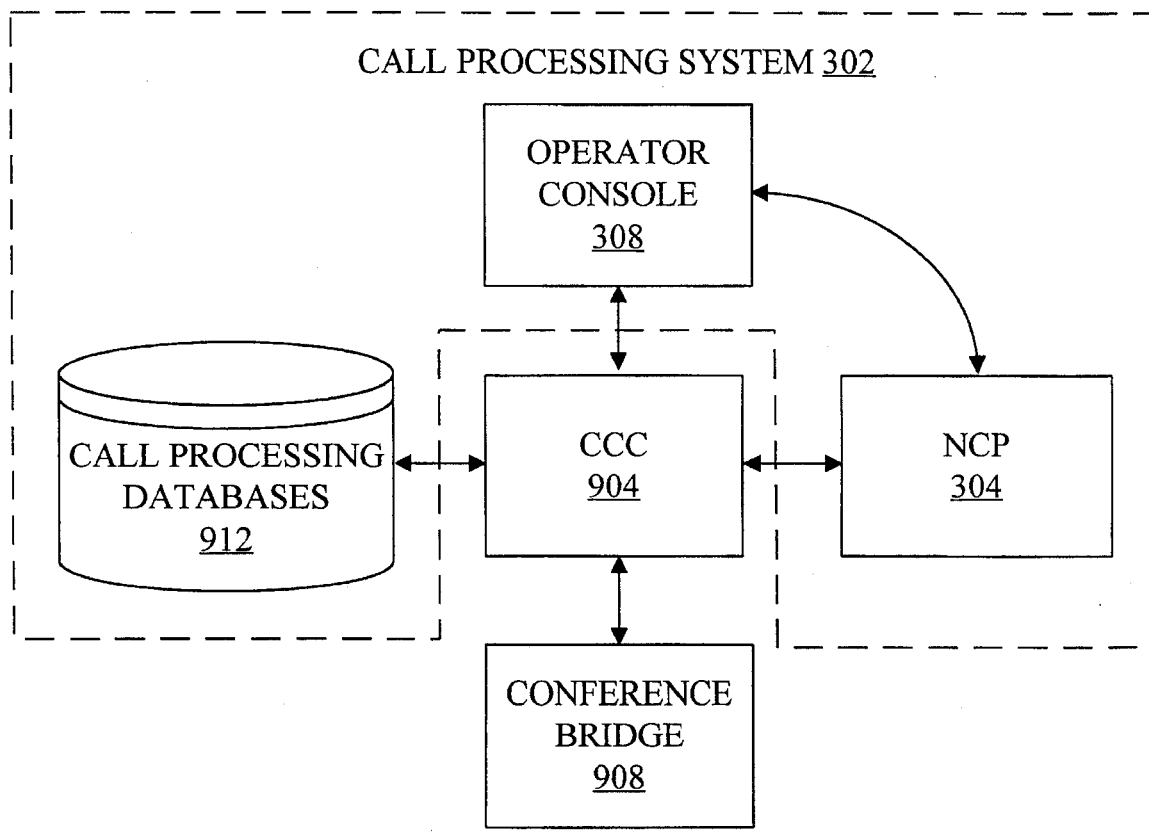
FIG. 9 is a high-level block diagram illustrating a system for providing conference calling features.

The system and method for providing conference calling capabilities to users 106 or subscribers 114 is now described. FIG. 9 is a high level block diagram illustrating a system for providing conference calling features. Referring now to FIG. 9, a conference call controller 904 is provided to interface to call processing system 302. Conference call controller 904 provides an interface between call processing system 302 and a conference bridge 908. Conference call controller 904 provides the primary functionality required for implementing conference calling features. Conference call controller 904 is responsible for allocating the conference call, scheduling resources to support the conference call, setting up the conference call, and completing the conference call.

Conference bridge 908 bridges the conference participants together on the conference call. Conference bridge 908 can be implemented in a variety of situations depending on the requirements of the specific application. In one embodiment, conference bridge 908 is implemented using a general purpose computer, such as a personal computer with a switch matrix board to provide the necessary communications interface. One such switch matrix board is the Amtelco XDS Digital Switch Matrix Board, available from American Tel-A-System, Inc., in McFarland, Wis., U.S.A.

This representative architecture can be implemented using a DTI-48 dual T1 board (supporting two T1 connections) and a VBX 1200 12-port voice processing board. These boards are available from Natural Microsystems Corporation, in Natick, Mass., U.S.A. Each DTI-48 board provides 48 T1 conference ports 1116 and each VBX 1200 provides 12 DSP ports 1112 and associated DSPs 1108.

Figure 10:
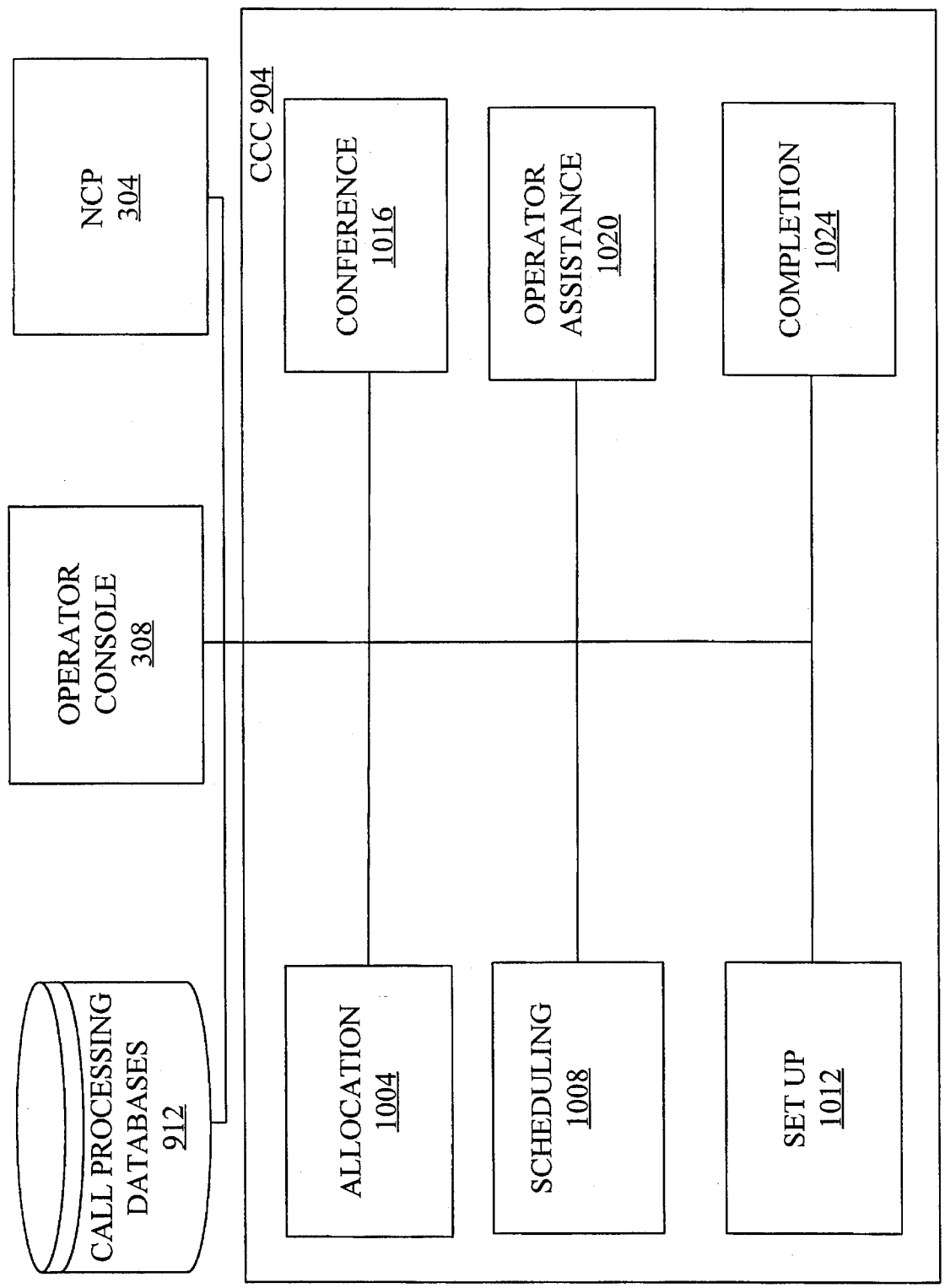
FIG. 10 is a block diagram illustrating the conference call controller in greater detail.

FIG. 10 is a block diagram illustrating conference call controller 904 in greater detail. FIG. 10 illustrates a representative functional architecture of conference; call controller 904. It should be noted that this functional architecture is not necessarily a physical architecture. This representation was chosen to best describe the functionality of conference call controller 904. Any number of physical architectures can be used to implement this representative functional architecture.

Referring now to FIG. 10, conference call controller 904 comprises numerous functional components. These components include allocation 1004, scheduling 1008, setup 1012, conference 1016, operator assistance 1020, and completion 1024. These functional components communicate with call processing system 302 as described above. Each of these components is now briefly introduced.

Allocation 1004 verifies that sufficient system resources are available for the conference and is responsible for allocating the required resources to a conference call.

Scheduling 1008 is responsible for gathering information needed to set up and complete the conference. Such information can include billing information, names and numbers of conference participants, conference characteristics or features, and other like information.

Setup 1012 is initiated once scheduling information reaches conference call controller 904. This includes calling all of the conference participants.

Conference 1016 is responsible for initiating the actual conference call itself using a method for tying all of the conference participants into the conference call.

Operator assistance 1020 provides operator support to an ongoing conference. Operator assistance can, for example, add or remove a conference participant, determine the status of a conference in session, or cancel the conference entirely.

Completion 1024 provides conference termination functionality. This includes conference cleanup such as announcing each participant as he or she leaves the conference, and freeing system resources as they become available as a result of conference closure.

Figure 11:
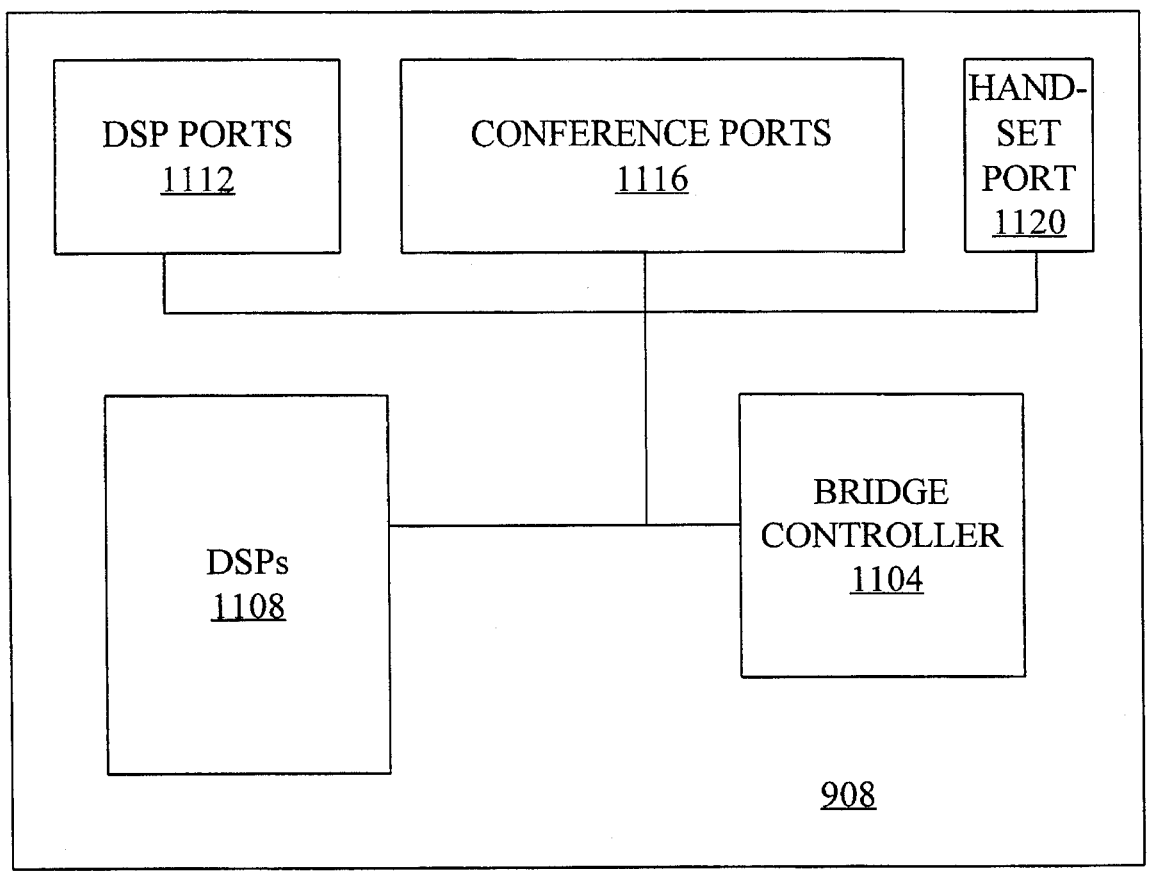
FIG. 11 is a block diagram illustrating a representative architecture of conference bridge.

FIG. 11 is a block diagram illustrating a representative architecture of conference bridge 908. In this embodiment, conference bridge 908 has conference ports 1116, DSP (digital signal processor) ports 1112, a handset port 1120, DSPs 1108 and a bridge controller 1104. Conference ports 1116 provide ports for conference participants and for operator consoles 308. DSPs 1108 process signals received over ports 1116, such as DTMF signals. DSPs 1108 can also play a script or a DTMF tone.

Bridge controller 1104 controls the allocation and bridging of ports 1116 and DSPs 1112 to a conference call. Some operations performed by bridge controller include connecting two ports together, disconnecting already connected ports, adding one or more ports to an existing conference, and removing one or more ports from an existing conference. The bridge controller's data structures include a list of connections between ports, a list of ports that are assigned to a conference, and an identification of specific streams used by a conference.

With the above serving as an introduction and overview of a system used to implement conference calling features, an overview of a method for implementing such features is now described. The functionality of conference call controller 904, conference bridge 908, and the associated call processing hardware is described in conjunction with specific messages. It should be understood that the specific messages described herein are presented as an example implementation only.

Figure 12:
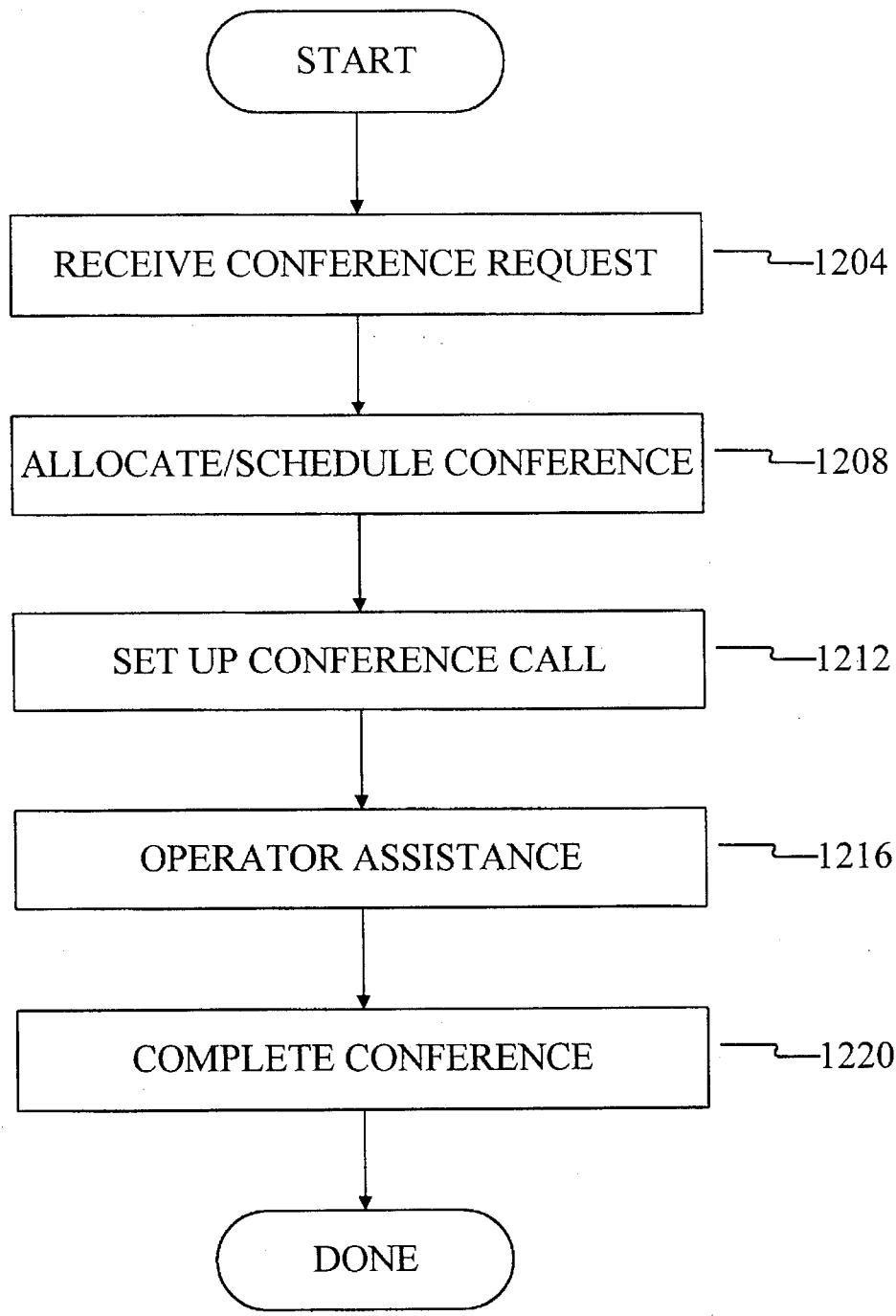
FIG. 12 is an operational flow diagram illustrating the manner in which the conference call feature is implemented according to one embodiment of the invention.

FIG. 12 is an operational flow diagram, describing the manner in which the conference call feature is implemented according to one embodiment of the invention. Referring now to FIGS. 9, 10, 11, and 12 in a step 1204, conference call controller 904 receives a request to schedule a conference call. This request can be a request to schedule an immediate conference call to be set if resources are available, or to schedule a conference call at a future date and time. In one embodiment, the request is received by conference call controller 904 from an operator console 308.

In a step 1208, conference call controller 904 allocates resources to and schedules the conference. In this step, allocation 1004 verifies that there are sufficient resources to handle the conference request. For example, allocation 1004 verifies that there are sufficient resources available on conference bridge 908 such as conference ports 1116 and DSP ports 1112. Once these resources are allocated, scheduling 1008 gathers the information needed to set up and complete the conference. In this step, scheduling 1008 gathers the names and numbers of conference participants, billing information, and conference characteristics.

In a step 1212, at the time the conference call is to take place, setup 1012 sets up the conference call. This step includes calling the conference participants and tying them into the conference call.

In a step 1216, operator assistance 1020 can be provided where required. For example, the conference participants may wish to add a new party to the conference call. In this situation, operator assistance 1020 would take the steps necessary to bring that additional party into the conference call.

In a step 1220, when the conference call draws to a close, it is completed by completion 1024. In this step, resources are de-allocated, making them available for other conference calls.

The above description provides a high-level overview of the conference call features provided by conference call controller 904 and conference bridge 908. Each of these features are now described in greater detail.

2.1 Conference Call Allocation

As described above, when a conference request is received, the first thing the conference call controller 904 does is check the availability of the resources required to support the conference call. If available, these required resources are allocated to the conference call. This verification and allocation phase is now described in greater detail.

Figure 13:
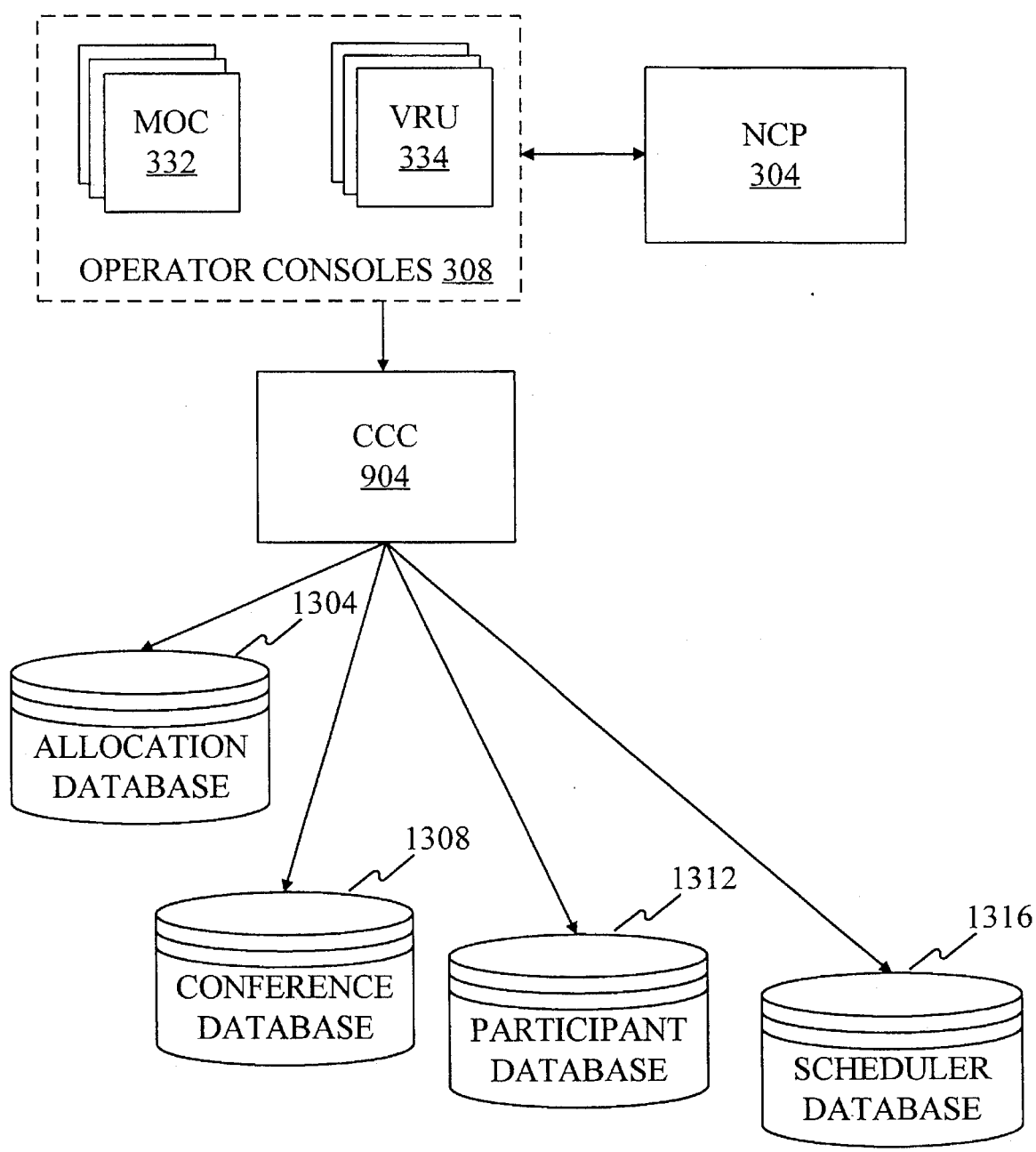
FIG. 13 is a block diagram illustrating the allocation and scheduling phases of a conference call.

FIG. 13 is a block diagram illustrating the allocation and scheduling phases of a conference call. Referring now to FIG. 13, conference call controller 904 interfaces with several databases. These include an allocation database 1304, a conference database 1308, a participant database 1312, and a scheduler database 1316.

Allocation database 1304 contains information pertaining to the resources allocated for conference calls. The information can include a Bridge ID, a DSP allocation array, a port allocation array, and a time field. The bridge ID contains a unique bridge identification code for the conference. The DSP array contains an array of DSP ports 1112 reserved for the conference. The port array contains an array of conference ports 1116 reserved. In one embodiment, the DSP allocation army and the port allocation array each contain 96 elements, where each element represents a fifteen minute period. In one embodiment, this allocation information is stored in records which represent one day's worth of allocations for one specific conference bridge 908. An example allocation record layout is illustrated in Table 1.

To determine the resources allocated for a specific conference bridge at a specific date and time, a time key is first determined. The time key is midnight (00:00) for the specified date and time, represented in Greenwich Mean Time (GMT). To determine which DSPs 1108 and conference ports 1116 to interrogate, the number of minutes between midnight and the scheduled conference time is determined. This number of minutes is then divided by fifteen.

TABLE 1

Allocation Record Layout

| Time: | Midnight (00:00) GMT for the day represented | |
|---|---|---|
| Bridge ID: | Bridge ID for the conference bridge 908 represented | |
| DSPs [0] | DSPs 1108 allocated from | 00:00–00:15 |
| DSPs [1] | | 00:15–00:30 |
| DSPs [2] | | 00:30–00:45 |
| . | | |
| . | | |
| . | | |
| DSPs [95] | | 23:45–24:00 |
| Conference ports [0] | Conference ports 1116 allocated from | 00:00–00:15 |
| Conference ports [1] | | 00:15–00:30 |
| Conference ports [2] | | 00:30–00:45 |
| . | | |
| . | | |
| Conference ports [95] | | 23:45–24:00 |

Conference database 1308 contains information for each scheduled conference. The information can be organized in a number of different ways. In one embodiment, the information is organized into records so there is one record for each conference. In this embodiment, the information stored in each record can include a conference ID for the conference, the number of ports allocated to the conference, the date and time the conference is scheduled to start, the scheduled duration of the conference, conference characteristics, billing criteria, contact name and telephone numbers, and the type of conference. Conference types can include operator assisted, scheduled operator assisted, or Meet Me.

Participant database 1312 includes participant information for each conference call. This information can include a unique participant ID for each conference participant. Each conference participant can be designated as a particular type of participant, such as a leader, a single participant or a group participant. Additional information can include an access mode, indicating how the participant will join the conference (i.e., will controller 904 call the participant, or will the participant call in) and billing information, indicating whether that participant is to be billed for his or her portion of the call. The participant information can also include the participant's phone number, the participant's name and company, and a connect mode indicating whether the participant will be connected with listen only ability or with both listen and talk ability.

In one embodiment, the participant database 1312 is organized such that there are multiple participant types and one record for each participant type. Each record contains a conference ID to identify the specific conference in which that particular participant type is participating.

Scheduler database 1316 is used to schedule call process events such as conference calls. Operations such as MAKE EVENT, REMOVE EVENT, and PERFORM EVENT operations are used to manipulate the scheduled call process event. Scheduler database is capable of sending a PERFORM EVENT message to conference call controller 904 indicating that a particular conference is scheduled to begin. In one embodiment, records in scheduler database 1316 include a time field indicating the scheduled time of the call process event, a schedule handle, an application handle, and a service name. The schedule handle is a unique identifier assigned to the scheduled event. The application handle (e.g., the CONFERENCE ID 1722 (illustrated in FIG. 17)) is a unique identifier assigned by the requesting application. The service name is the name of the service to receive the notice that an event is scheduled to begin. In the case of a conference call, the service is conference call controller 904.

Figure 15:
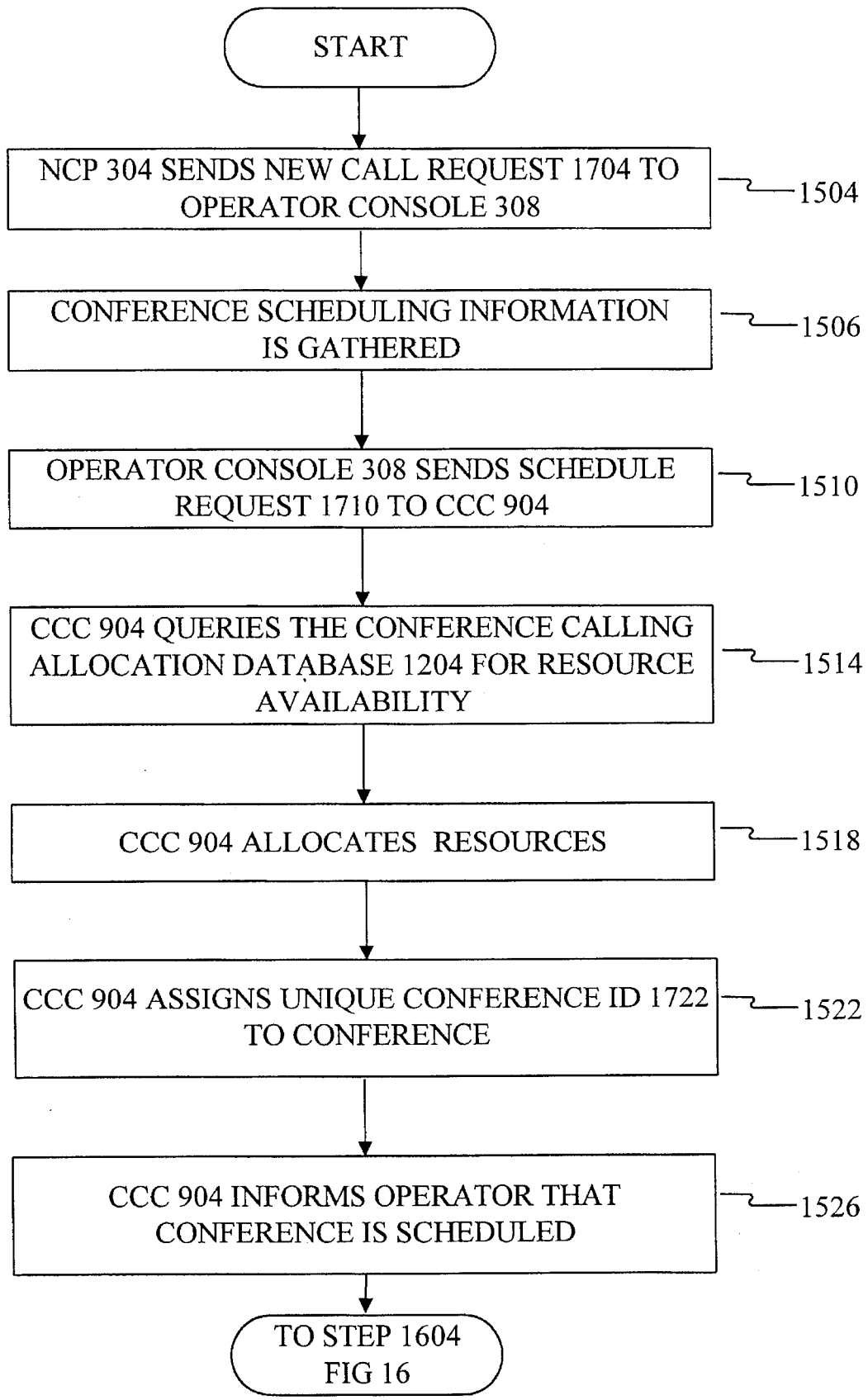
FIGS. 15 and 16, is a flowchart illustrating the steps associated with allocation and scheduling a conference call according to one embodiment of the invention.
Figure 16:
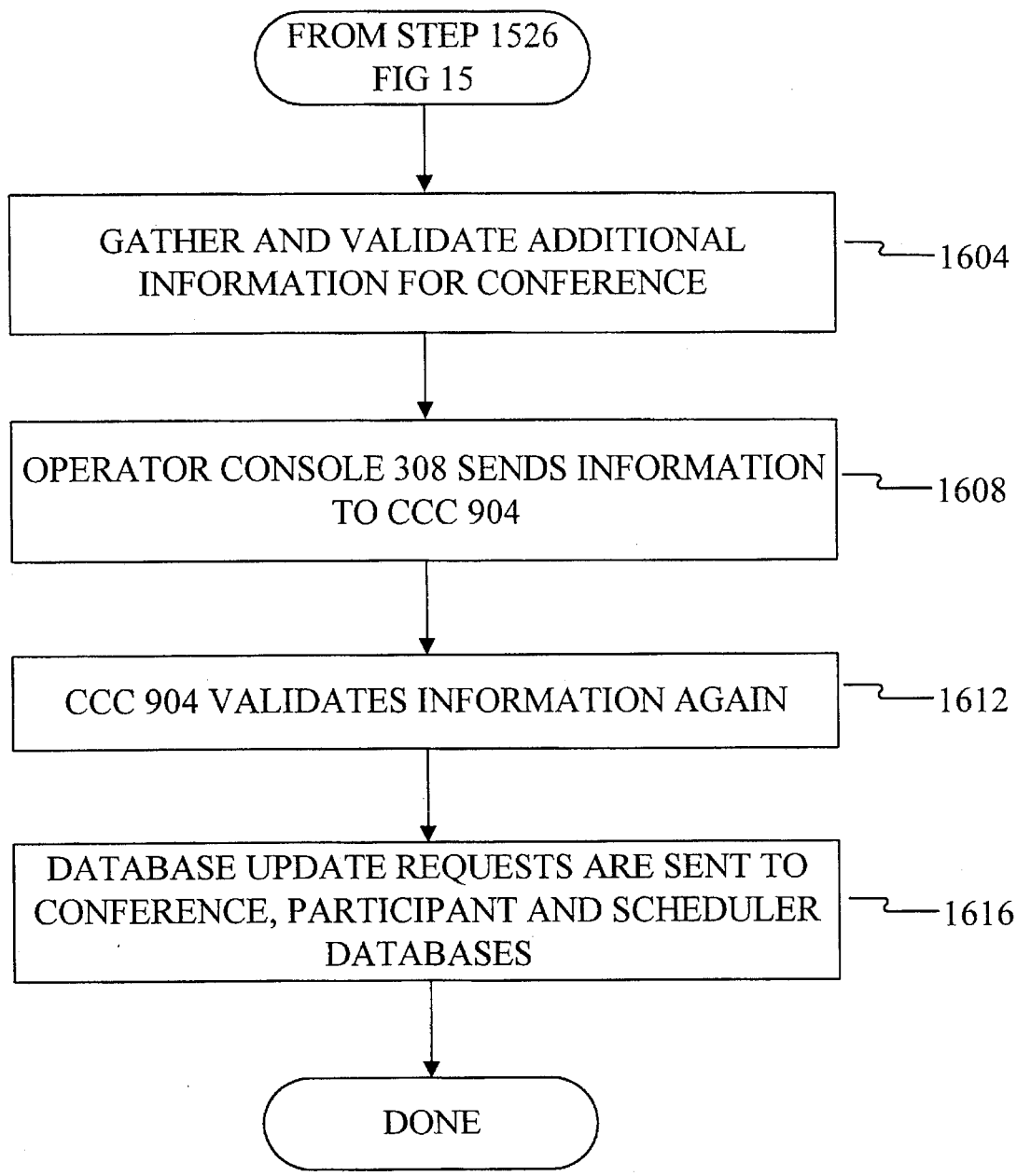
Figure 17:
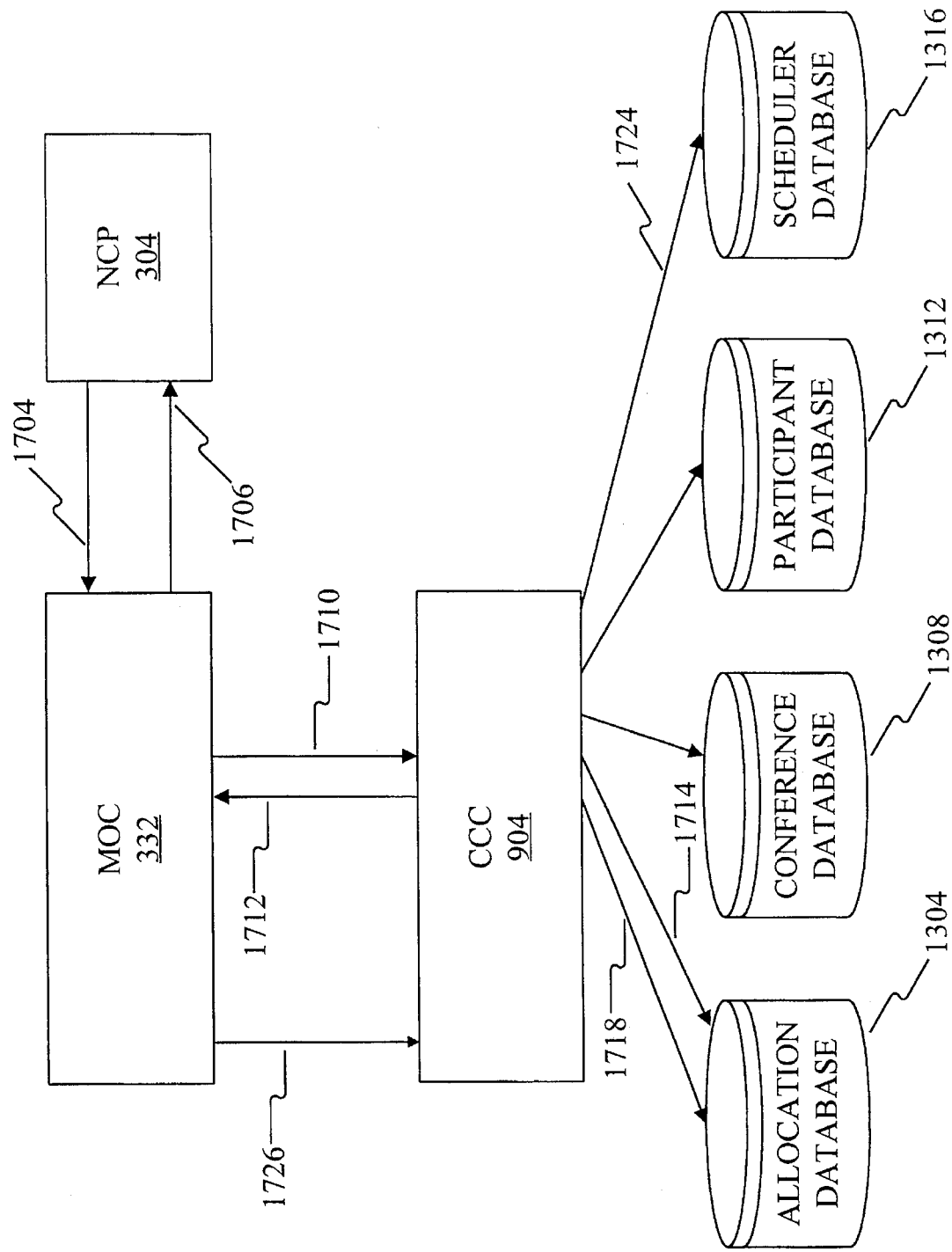
FIG. 17 is a dataflow diagram illustrating messages associated with the allocation and scheduling phases of a conference call.

FIG. 14, which comprises FIGS. 15 and 16, is a flowchart illustrating the steps associated with allocation and scheduling a conference call according to one embodiment of the invention. FIG. 17 is a dataflow diagram illustrating messages associated with the allocation and scheduling phases of a conference call. Referring now to FIGS. 9, 13, 15, 16, and 17, allocation and scheduling is now described. When a conference participant (e.g., a user 106) wants an operator to set up a conference call, the user dials in to call processing system 302. This can be done in a number of different ways. For example, in one embodiment, the user makes the initial call using an enhanced services card.

As described above, with reference to FIGS. 3–8, when the call is received, network control processor 304 receives call data 144 and determines that operator assistance is required. At this time, network control processor 304 commands matrix switch 306 to route the call audio 142 to an operator console 308. Depending on the implementation of call processing system 302, the call could be handled by a manual operator console 332 or by an automated voice response unit 334. In one embodiment, all enhanced services calls are handled by a human operator at a manual operator console. In another embodiment, all enhanced services calls are handled by an automated voice response unit. In yet another embodiment, the allocation of an operator console 308 is made based on availability, or based on user definitions.

In the current example, consider a call processing system 302 in which enhanced services card calls are routinely handled by an automated voice response unit 334. When the automated voice response unit 334 answers the call, the user then enters his or her enhanced services card number for recognition by voice response unit 334.

At this phase, automated voice response unit 334 provides a scripted menu to the caller, providing the caller with features that the caller can access. The caller selects the conference call option from these choices. In one embodiment, this is accomplished by the caller simply pressing a number on the keypad corresponding to the conference call selection number.

To set up the conference call, a human operator collects significant information about the requested conference—date, time, number of participants, duration, names, phone numbers, billing information, and other conference data that dictate how the conference will be conducted. In an alternative embodiment, an automated voice response unit 334 could be used to query the caller with scripted text and the caller would respond by entering the requested information using the telephone keypad, or other electronic means.

Where conference call setup is to be handled by a human operator, the call must be transferred from the voice response unit 334 to a human operator at a manual operator console 332. Therefore, in a step 1504, network control processor 304 sends a NEW CALL REQUEST message 1704 to an available manual operator console 332, that is manned by an operator with the ability to handle a conference call. Manual operator console 332 confirms receipt of NEW CALL REQUEST message 1704, by sending a NEW CALL RESPONSE message 1706 back to network control processor 304. NEW CALL RESPONSE message 1706 is used to verify that the manual operator console 332 has received the incoming call.

Automated scripting is provided to the operator at manual operator console 332 so that the appropriate information can be provided to and obtained from the caller. In one embodiment, the script appears on a display screen on the operator console. The operator reads the script to the caller, which can provide text to identify the operator as that of a particular carrier, and ask the caller information such as the date and time of the conference call, the number of participants, and the anticipated duration of the conference call. The operator enters this information at manual operator console 332. This occurs in a step 1506.

Once this information is entered, in a step 1510, manual operator console 332 sends a SCHEDULE REQUEST message 1710 to conference call controller 904. SCHEDULE REQUEST message 1710 includes all of the information gathered in step 1506.

Before the schedule request can be fulfilled, resources must be examined to determine that sufficient resources are available for the conference at the desired time and for the desired duration. Therefore, in a step 1514, conference call controller 904 queries allocation database 1304 to determine resource availability. These resources can include conference ports 1116 and DSP ports 1112. In one embodiment, this is accomplished by conference call controller 904 sending a DATABASE SEARCH REQUEST message 1714 to allocation database 1304.

If sufficient resources are available to handle the requested conference call, conference call controller 904 allocates the required resources to the conference call. This occurs in a step 1518. To accomplish this, conference call controller 904 sends a DATABASE UPDATE REQUEST message 1718 to allocation database 1304 to reserve those resources for that conference call.

Once those resources are reserved, in a step 1522, conference call controller 904 assigns a unique CONFERENCE ID 1722 to the specific conference requested by the caller. Any subsequent requests that the console directs to conference call controller 904 regarding this conference will reference the assigned CONFERENCE ID 1722.

In a step 1526, conference call controller informs the operator at manual operator console 332 that those resources have been successfully allocated by sending a SCHEDULE RESPONSE message 1712 to manual operator console 332. The assigned CONFERENCE ID 1722 is included as a part of SCHEDULE RESPONSE message 1712. The operator can then provide a confirmation to the caller that the conference call has been scheduled and will take place as planned.

In a step 1604, additional information for the conference is gathered and validated by manual operator console 332. This information can include the names of the participants in the conference call, the respective telephone numbers, how each leg of the call will be paid, and characteristics of the conference. So the human operator does not have to memorize what is to be asked of the caller, the operator can be provided with a script by manual operator console 332. Such a script provides the text so the operator can simply read the questions to the caller and enter the caller's answers into the manual operator console 332.

In a step 1608, once the operator has entered this information into the manual operator console 332, the information is sent to conference call controller 904. In one embodiment, this is accomplished by sending a SETUP REQUEST message 1726 to conference call controller 904.

In a step 1612, conference call controller 904 again validates the conference call information. This additional validation step is performed to ensure the integrity of the conference data used by conference call controller 904.

In a step 1616, the databases are updated to reflect the scheduled conference. In one embodiment, conference database 1308 and participant database 1312 are updated via DATABASE UPDATE REQUEST messages 1718. In order to set the event for the scheduled date and time, scheduler database 1316 is also updated via a MAKE EVENT REQUEST message 1724.

The conference is now scheduled for its designated time with the designated conference participants. At the designated date and time, call setup 1012 begins calling the conference participants.

2.2 Conference Call Setup

Conference call controller 904 controls call conferencing. Conference call controller 904 is informed by the scheduler (i.e., scheduler database 1316) when a conference is due to occur. Conference call controller 904 then gets the participant and resource information it needs from the appropriate databases, and conference call controller 904 begins initiating call setup.

To begin calling conference participants, conference call controller 904 polls the call route distributor (part of network control processor 304) to find out which operator consoles 308 are available, then determines how many of those consoles 308 can be allocated to this conference. For instance, if the conference is to involve 15 conference participants and 12 operator consoles 308 are available, conference call controller 904 allocates a percentage of those operator consoles 308-nine, for example—to the task of calling participants for this conference. If nine operator consoles 308 can currently be assigned to this task, conference call controller 904 initiates simultaneous dial-outs to the first nine conference participants, using as a vehicle the allocated operator consoles 308.

As each operator console 308 is engaged, the console operator sees a message on the console display indicating that a dial-out to a conference participant is in process. Note that the operator did not dial the call; the controller has done this for the operator. At this point, the operator has no definitive information about the conference. The operator does not have access to the names of remaining participants or the conference status during the ADD function.

When the called party (conference participant) answers, a script appears on the console display, prompting the operator to inform the participant that his/her conference is due to begin and ask whether he or she wishes to participate. If the conference participant agrees, the operator presses a key that allows the conference participant to join the conference, and the operator console 308 is then released.

Conference call controller 904 tracks the number of conference participants who have joined the conference and how many remain. As a result of periodically polling the call route distributor for available consoles 308, conference call controller 904 periodically adjusts the number of console allocations. If more conference participants need to be contacted, conference call controller 904 continues to channel each dial-out through available conference consoles 308 until all conference participants have been contacted.

Conference call setup is now described in more detail. The setup phase of a conference call begins when scheduler database 1316 sends a message to conference call controller 904. Conference call controller 904 retrieves call processing and configuration characteristics (features) applicable to the conference call. Conference call controller 904 searches conference database 1308 and participant database 1312.

Once participant information is retrieved from participant database 1312, conference call controller 904 actually initiates each dial-out to the participants. It does this by utilizing as many different operator consoles 308 as are available. In this manner, the conference setup time can be reduced by contacting multiple participants simultaneously.

If the conference call is being set up on-the-fly, as opposed to being scheduled for a later date and time, the allocation and setup information that was collected is used immediately rather than stored for later use. For a conference call to occur immediately, the participant who set up the conference call is transferred to conference bridge 908 while the remaining participants are contacted. When each participant has been contacted, he or she is added to the conference.

Figure 18:
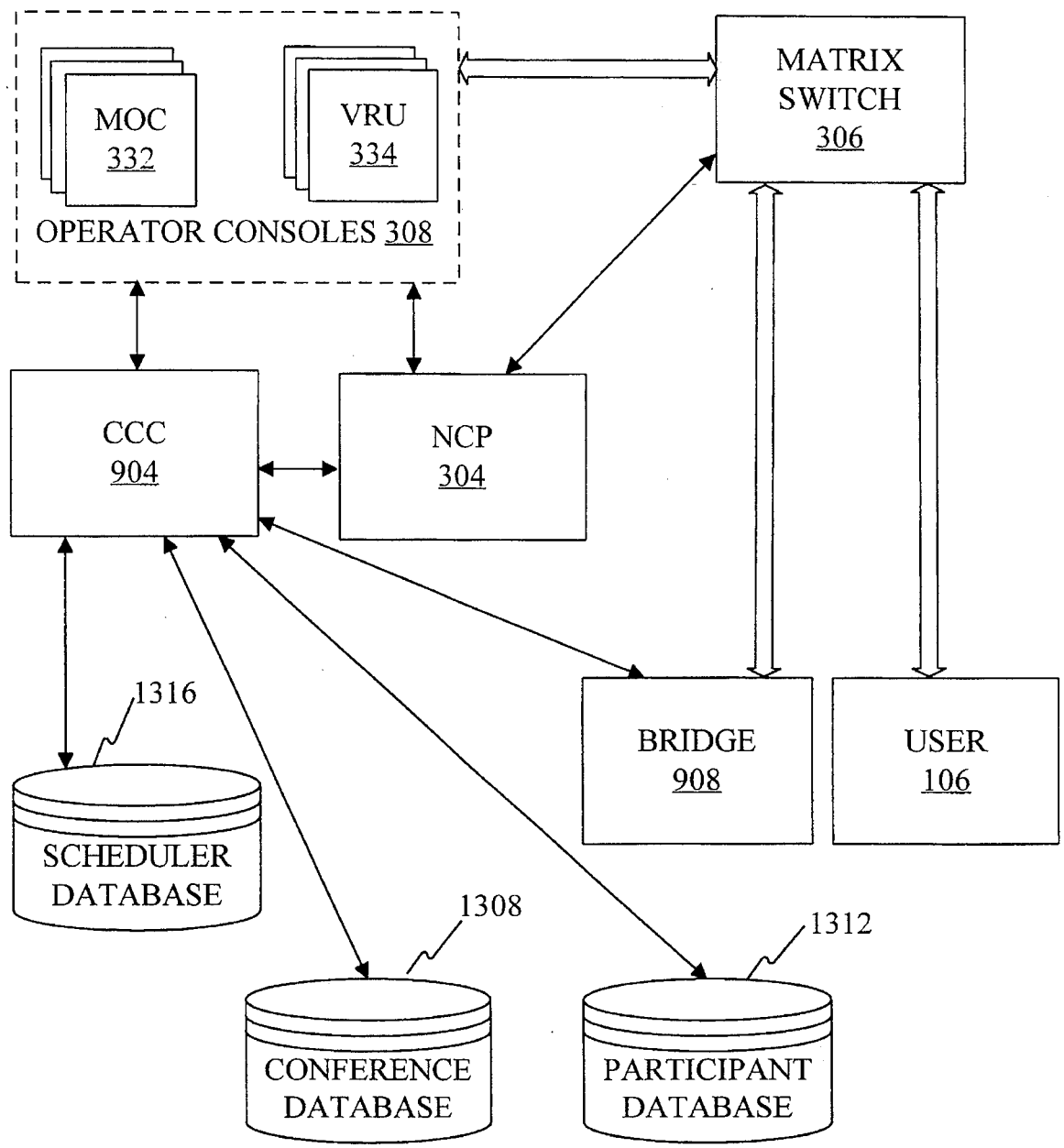
FIG. 18 is a block diagram illustrating the components utilized during the setup phase of a conference call.

FIG. 18 is a block diagram illustrating the components utilized during the setup phase of a conference call. These components include conference call controller 904, conference bridge 908, network control processor 304, matrix switch 306, operator consoles 308, conference database 1308, scheduler database 1316, and participant database 1312. Also illustrated in FIG. 18 is a conference participant labeled user 106. By its very nature, a conference call will typically have a plurality of conference participants (users 106).

Figure 19:
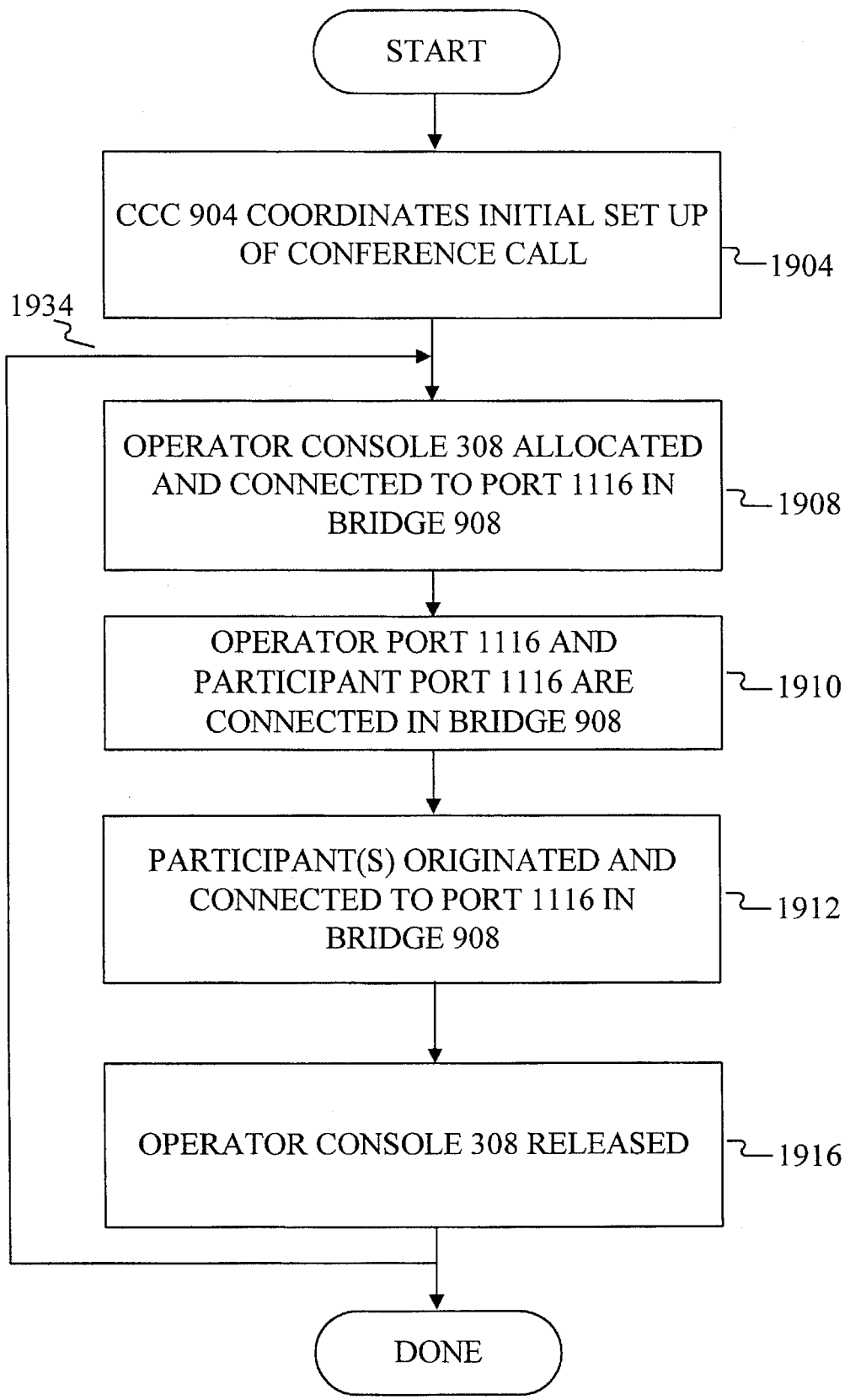
FIG. 19 is a high-level operational flow diagram illustrating the operations performed during the call setup phase of a conference call.

FIG. 19 is a high-level operational flow diagram illustrating the operations performed during the call setup phase of a conference call. Referring now to FIGS. 18 and 19, the setup phase of a conference call is generally described. In a step 1904, conference call controller 904 coordinates initial setup of the conference call. This includes searching conference database 1308 and participant database 1312 for information pertaining to the conference call.

In a step 1908, operator console 308 is allocated to call a conference participant and is connected to a conference port 1116. This specific conference port 1116 is referred to as operator port 1116 to distinguish it in the following description.

In a step 1910, operator port 1116 is connected to an available conference port 1116 allocated to this conference. This port is referred to as a participant port 1116 to distinguish it in the following description.

In a step 1912, a conference participant is originated and connected to the participant port 1116 at conference bridge 908. In this step, operator console 308 (i.e., a human operator at manual operator console 332 or an automated voice response unit 334) contacts the participant. If the participant wishes to join the conference, operator console 308 informs the conference call controller 904.

In a step 1916, operator console 308 is released from the conference call. This frees operator console 308 so that it can perform other tasks for call processing system 302. If there are additional conference participants to be contacted, steps 1908, 1910, 1912 and 1916 are repeated. This is illustrated by flow line 1934.

As discussed above, conference participants can be added to the conference after the operator console 308 has been released and re-allocated (flow line 1934). If the operator console 308 is released between participants, the conference call may have to wait for an available operator console 308 during high-traffic times. One reason for releasing the console 308 between participants is so that the console 308 can handle other tasks for network control processor 304. In this scenario, the conference and other users can contend for operator support via the network control processor 304.

Figure 20:
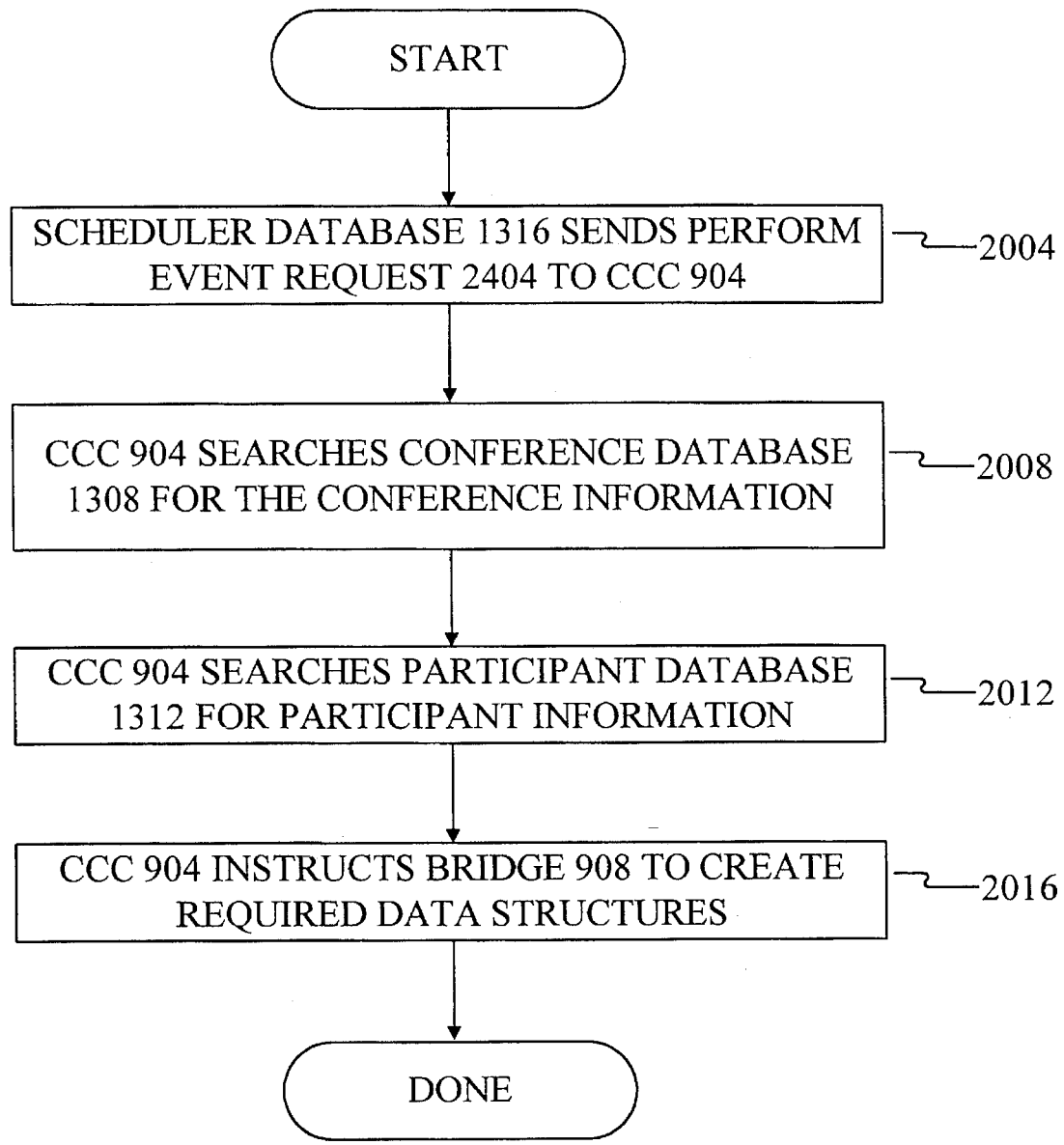
FIG. 20 is an operational flow diagram illustrating the initial setup of the conference call, in greater detail.
Figure 24:
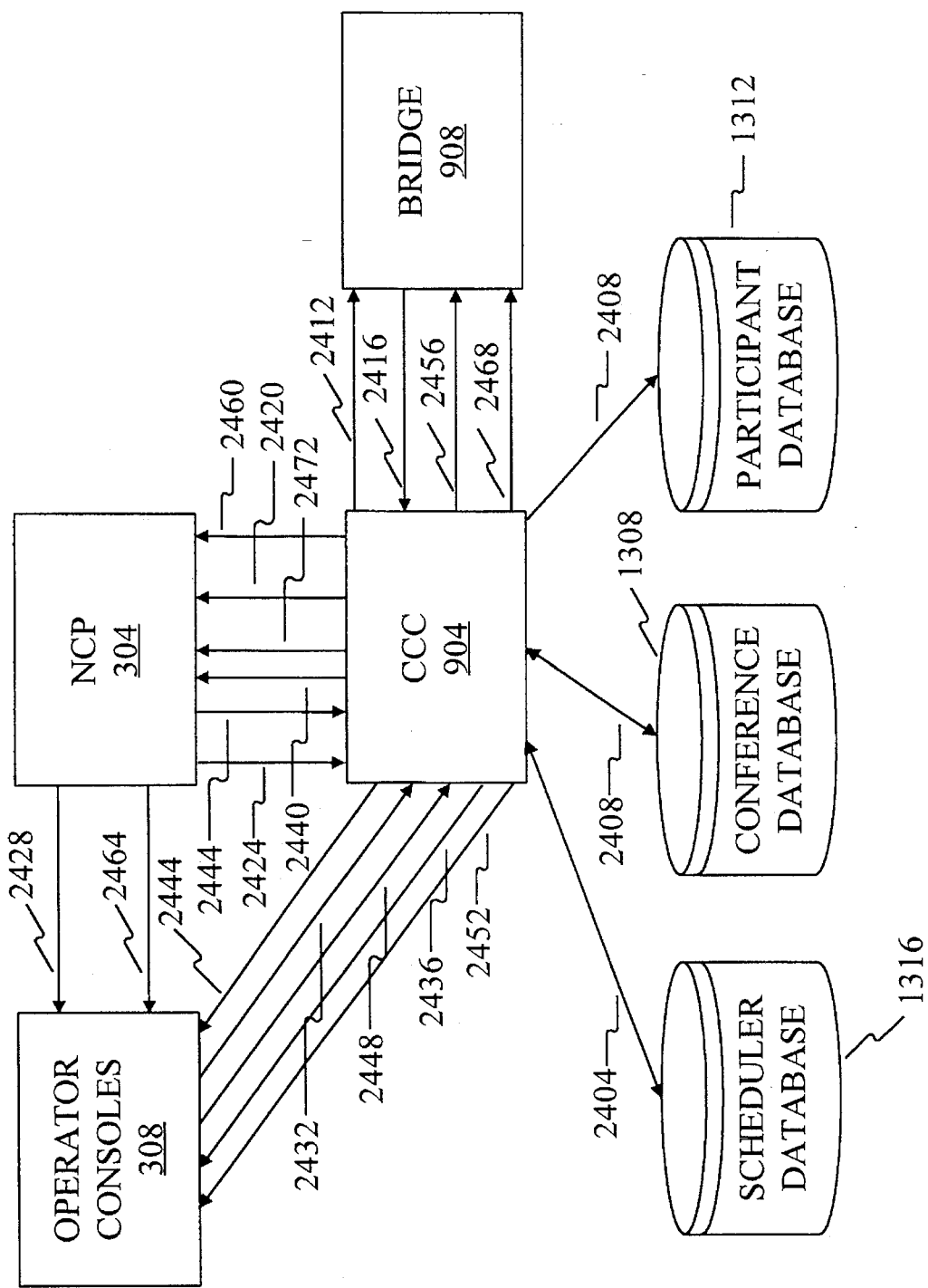
FIG. 24 is a data flow diagram illustrating messages used to set up the conference call according to one embodiment of the invention.

The above discussion provides a high-level overview of the steps involved in the setup phase of a conference call. Each of these steps is now described in greater detail. FIG. 20 is an operational flow diagram illustrating step 1904, the initial setup of the conference call, in greater detail. FIG. 24 is a data flow diagram illustrating messages used to set up the conference call according to one embodiment of the invention.

Referring now to FIGS. 18, 20 and 24, the initial setup of a conference call (i.e., step 1904) is now described. In a step 2004, at the date and time of the scheduled conference, scheduler database 1316 sends a PERFORM EVENT REQUEST message 2404 to conference call controller 904. PERFORM EVENT REQUEST message 2404 informs conference call controller 904 that the scheduled conference is due to begin. The scheduled conference is identified by its associated CONFERENCE ID 1722.

In a step 2008, conference call controller 904 searches conference database 1308 for specific information pertaining to that particular conference call. This information can include specific start times and conference characteristics. In one embodiment, this is accomplished by the conference call controller 904 sending a DATABASE SEARCH REQUEST message 2408 to conference database 1308. Included with this DATABASE SEARCH REQUEST message 2408 is a CONFERENCE ID 1722 referencing the correct conference call. In response to this message, the correct conference information (i.e., the conference information pertaining to the CONFERENCE ID 1722) is returned to conference call controller 904.

In a step 2012, conference call controller 904 searches participant database 1312 for information pertaining to the conference participants. In this step, conference call controller retrieves the names and telephone numbers of the individuals participating in the conference call. In one embodiment, this is accomplished by sending a DATABASE SEARCH REQUEST message 2408 to participant database 1312 for each conference participant to be included in the conference call.

Once these records have been retrieved in steps 2008 and 2012, conference call controller 904 can initiate setup of the conference call. In a step 2016, conference call controller 904 instructs conference bridge 908 to create the data structures required to track the conference call on the bridge. In one embodiment, this is accomplished by sending a MAKE CONFERENCE REQUEST message 2412 to conference bridge 908. MAKE CONFERENCE REQUEST message 2412 requests a bridge conference handle 2416 unique to the bridge itself, and instructs conference bridge 908 to allocate ports 1116 for the conference. Because conference call controller 904 retrieved the correct conference information in steps 2008 and 2012, conference call controller 904 knows the number of conference ports 1116 that are required to set up the conference. It should be noted that conference bridge 908 can allocate additional conference ports 1116, if needed, while the conference is in session.

At this point, the initial setup of the conference call (i.e., step 1904) is completed and conference call controller 904 is ready to call each of the conference participants. For each participant to be called, a participant bridge port 1116 is required. Also, because each conference call requires at least one operator console 308, one conference port 1116 (i.e., an operator port 1116) is required for interfacing to operator console 308. Because there are 64 conference ports 1116 in a preferred embodiment, each active conference can be assigned a conference port 1116 for an operator console 308. In an alternative embodiment, one conference port 1116 can be shared among all conferences as an operator port 1116. If multiple operator consoles 308 are used to set up the conference, an additional port 1116 is required for each additional operator console 308. Conference call controller 904 allocates these conference ports 1116, tracks conference port 1116 usage, and allocates an operator console 308 to handle the conference call.

In the preferred embodiment, there are 64 maximum available conference ports 1116. At least one of these 64 conference ports 1116 (although more than one is normal) must be available for operator assistance as a non-dedicated operator console 308. This scenario could allow a maximum of 63 conference ports 1116 to accommodate conference participants and a minimum of one conference port 1116 to accommodate an operator console 308. If all 63 conference ports 1116 are being used as participant ports 1116, requests for operator assistance could be queued until the operator port 1116 becomes available.

Realistically, however, most conferences are not large enough to use 63 participant conference ports 1116. Even when several conferences run concurrently, there is often a sufficient number of available conference ports 1116 to allow more than one conference port 1116 to be allocated as an operator port 1116 even to the point of each conference being serviced by a separate (but non-dedicated to any single conference) operator port 1116. The limitation is 64 conference ports 1116, but those conference ports 1116 may be allocated in any combination of participant and operator ports 1116 needed.

As described above with reference to FIG. 19, in a step 1908, an operator console 308 is allocated to handle the conference call and connected to conference bridge 908. Either an automated voice response unit 334 or a manual operator console 332 with a human operator can be used to connect the conference participants to the conference call. If a human operator is used, the operator can converse with the participants to remind them why they are being contacted and ask them if they still wish to participate in the conference call. Scripts can be provided to the human operator on a display screen of manual operator console 332, giving the operator conference information such as the participant's name, the conference leader, the company name, the names of other participants, and/or other like information (as long as that information was collected and stored when the conference was set up).

If an automated voice response unit 334 is used, this conference information can be provided to the participant via synthesized or prerecorded voice. In this embodiment, scripting can be used to provide custom prompts to the participant via automated voice response unit 334. If the participant is required to respond to the automated voice response unit 334 (e.g., a response whether the participant wishes to participate in a conference call, or a response to select conference options), such responses can be made using the participant's telephone keypad or other like means.

Figure 21:
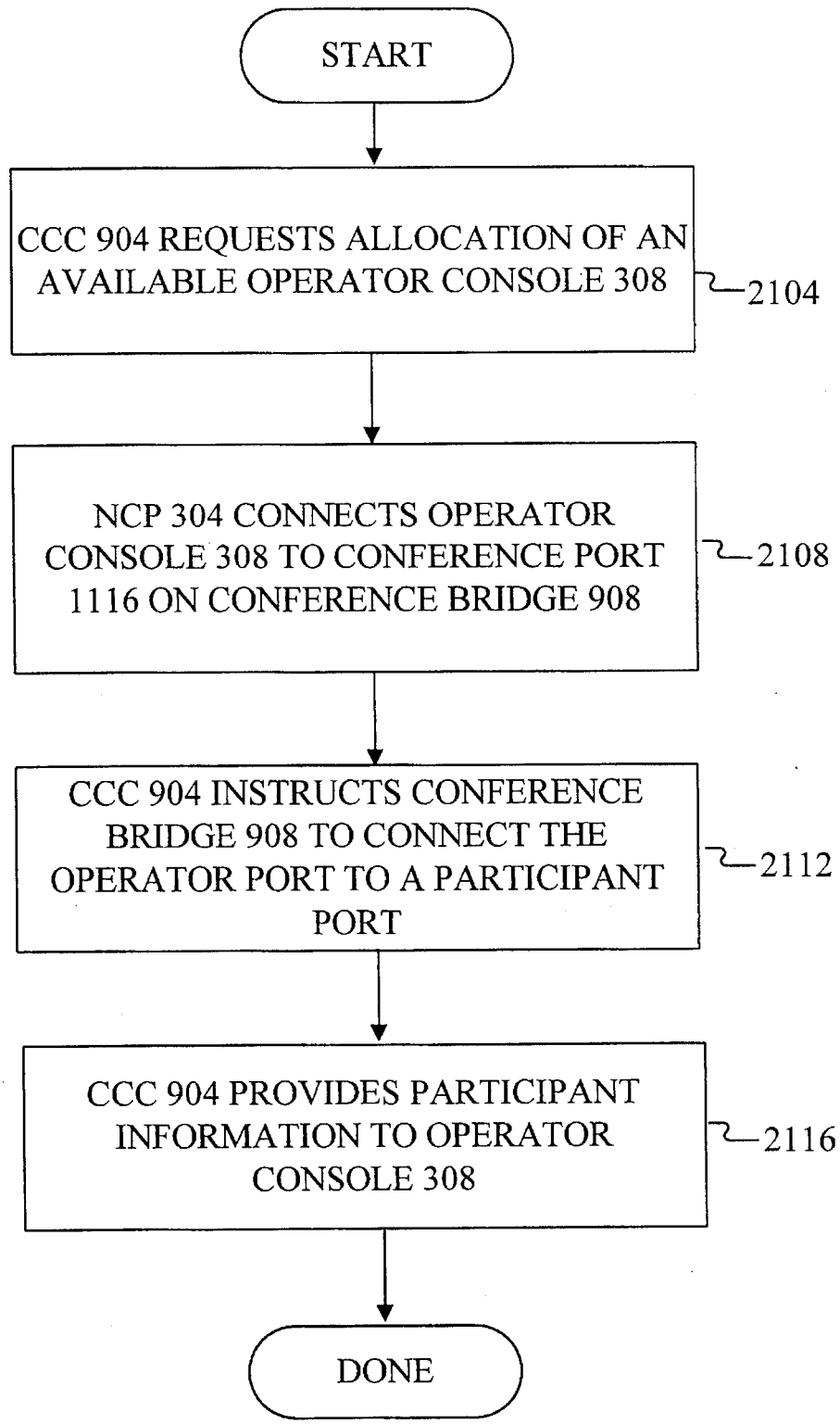
FIG. 21 is a flow diagram illustrating the allocation of an operator console to handle the conference call.

FIG. 21 is a flow diagram illustrating the allocation of an operator console 308 to handle the conference call (i.e., step 1908). Referring now to FIGS. 18, 21 and 24, in a step 2104, conference call controller 904 requests that network control processor connect an available operator console 308 to a conference port 1116 on conference bridge 908. In one embodiment, this is accomplished by sending an ORIGINATE TO CONSOLE REQUEST message 2420 to network control processor 304. In this embodiment, network control processor 304 replies to conference call controller 904 by sending an ANSWER REQUEST message 2424 to conference call controller 904.

In a step 2108, network control processor 304 connects operator console 308 to a conference port 1116 on conference bridge 908. Again, this conference port 1116 is referred to as an operator port 1116 for ease of description. In one embodiment, the allocated operator console 308 is connected to the operator port 1116 on conference bridge 908 via matrix switch 306. One way such a connection can be made is by network control processor 304 sending a NEW CALL REQUEST message 2428 to the operator console 308 to be allocated. In response, the allocated operator console 308 sends a PARTICIPANT REQUEST message 2432 to conference call controller 904. PARTICIPANT REQUEST message 2432 requests retrieval of the CONFERENCE ID 1722 and the participant information.

In a step 2112, conference call controller 904 instructs conference bridge 908 to connect operator port 1116 to participant port 1116.

In a step 2116, conference call controller 904 provides participant information to the allocated operator console 308. In one embodiment, this is accomplished by the conference call controller 904 sending a PARTICIPANT RESPONSE message 2436 to the allocated operator console 308 providing the requested participant information. Also included in the participant information can be the designation of one of the conference participants as the conference leader. The conference leader is the person who is designated as being "in charge" of the conference. Typically, the conference leader is the participant who scheduled the conference. However, at the time of scheduling, the participant scheduling the conference can designate one of the other participants as being the leader.

The designation of one participant as a leader is only important if particular conference characteristics are utilized. For example, one conference characteristic allows the conference to be set up so that only the leader of the conference can request operator assistance.

Figure 22:
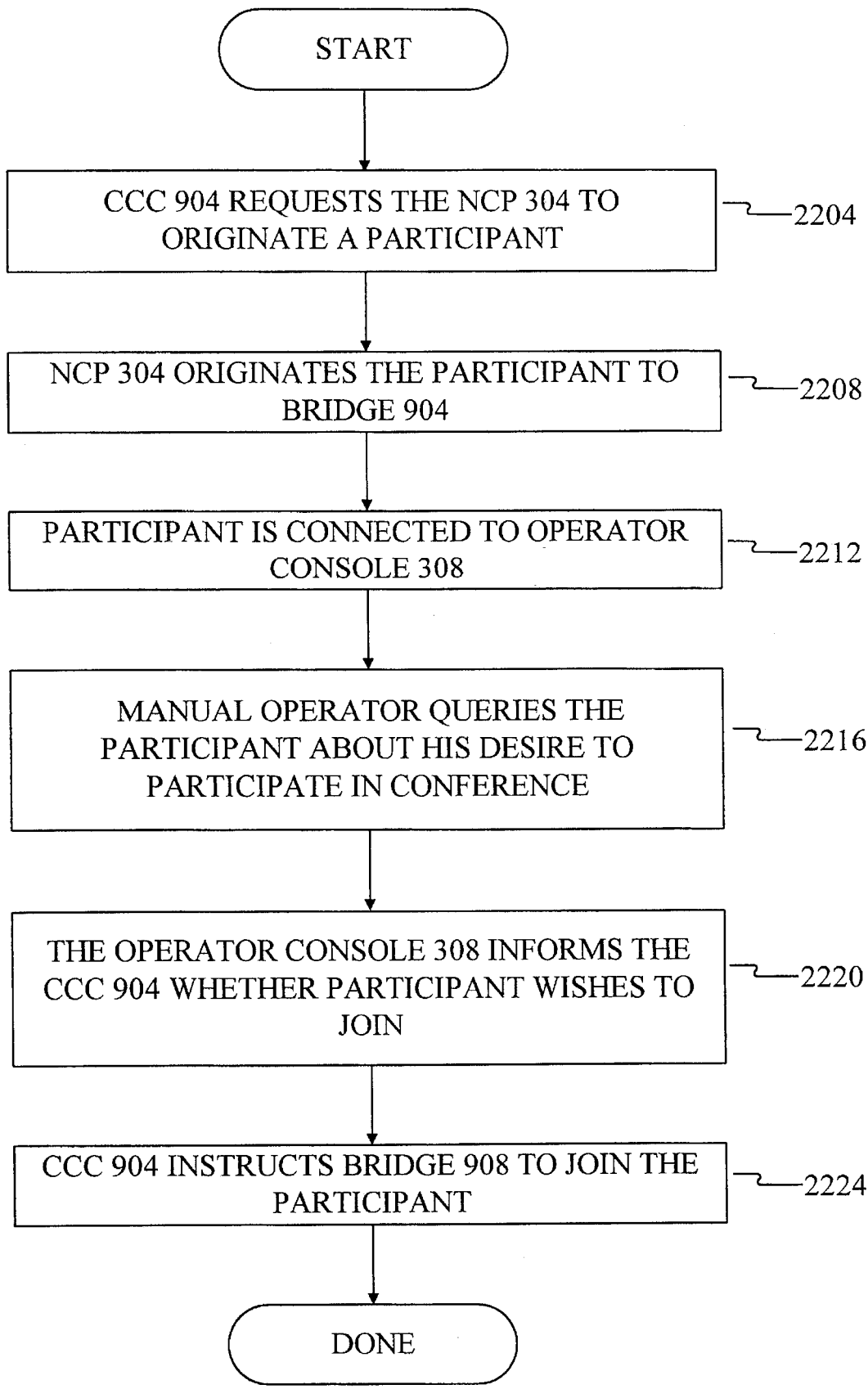
FIG. 22 is an operational flow diagram illustrating the steps associated with originating a participant and joining the participant in the conference.

At this time, conference call controller 904 is now ready to originate a participant. FIG. 22 is an operational flow diagram illustrating the steps associated with originating a participant and joining the participant in the conference (i.e., step 1912). Referring now to FIGS. 18, 22 and 24, in a step 2204 conference call controller 904 requests that the network control processor originate a call to a participant. In one embodiment, this is accomplished by sending an ORIGINATE REQUEST message 2440 to network control processor 304.

In a step 2208, network control processor 304 originates a call to the conference participant. In one embodiment, this is accomplished by originating a call to the conference participant and connecting the participant to a conference port 1116 (referred to as participant port 1116 for ease of description) on conference bridge 908 when the conference participant answers. When the participant answers the telephone, network control processor 304 sends an ANSWER REQUEST message 2444 to conference call controller 904 indicating that the participant answered. Conference call controller 904 forwards ANSWER REQUEST message 2444 to operator console 308 so that operator console 308 is aware that the participant has answered.

In a step 2212, the participant is connected to the allocated operator console 308. This is accomplished by conference call controller 904 instructing conference bridge 908 to connect operator port 1116 to participant port 1116.

In a step 2216, the operator at manual operator console 332 informs the participant that the conference is beginning and asks the participant whether he or she would still like to participate in the conference. Through the use of custom scripting, the operator can be provided with the name of the individual as well as other specific information regarding the conference. If the conference participant wishes to join in the conference call, the operator console 308 informs conference call controller 904 of this desire. This occurs in a step 2220. If this is a human operator at a manual operator console 332, the operator initiates this step by keying information into a terminal on manual operator console 332. For the case of an automated voice response unit 334, the notification in step 2220 occurs automatically upon receipt of the input from the participant. In one embodiment, operator console 308 sends a JOIN REQUEST message 2448 to conference call controller 904. In response, conference call controller 904 sends a JOIN RESPONSE message 2452, and informs the console what actions are needed to join the conference participant. For example, the console may be required to announce to the already on-line conference participants that the new conference participant is being joined to the conference call.

In a step 2224, conference call controller 904 instructs conference bridge 908 to join a participant in a conference call. In one embodiment, this is accomplished by sending an ADD message 2456 to conference bridge 908. ADD message 2456 informs conference bridge 908 to add participant port 1116 of the new conference participant with the other participant ports 1116 of the conference participants already on the call. In response, conference bridge 908 joins the appropriate conference ports 1116. After the operator has announced the new participant into the existing conference, the operator can perform operator assistance functions if requested. The operator console 308 is released after each conference participant is joined and is reallocated by the network control processor to add additional participants. This is illustrated in FIG. 19 by step 1916 and flow line 1934.

Figure 23:
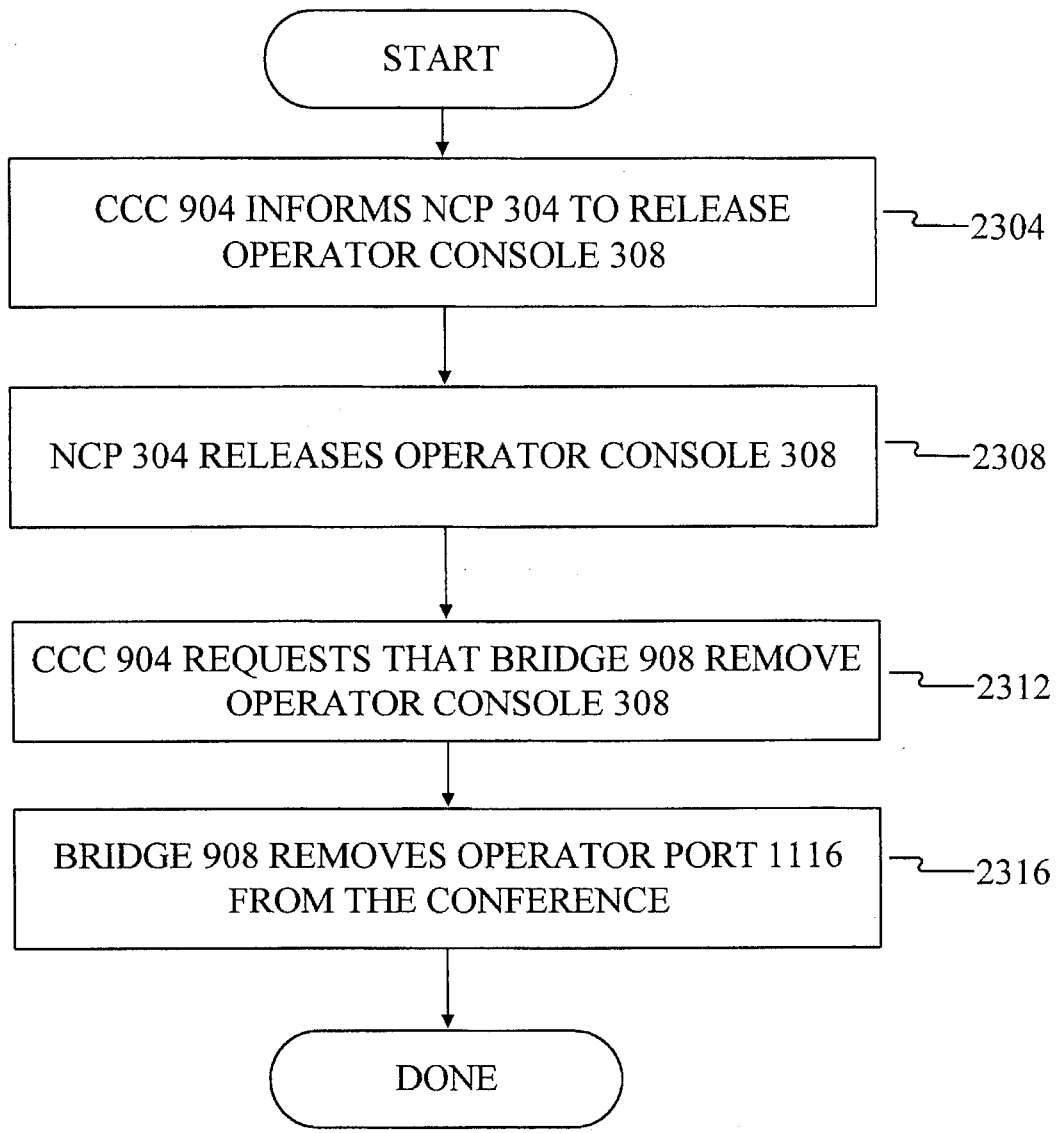
FIG. 23 is a flow chart illustrating the steps associated with releasing an allocated operator console.

Step 1916 of releasing an operator console is now described. FIG. 23 is a flow chart illustrating the steps associated with releasing an allocated operator console 308. Referring now to FIGS. 18, 23 and 24, in a step 2304, conference call controller 904 informs network control processor 304 to release operator console 308. In one embodiment, this is accomplished by sending a RELEASE REQUEST message 2460 to network control processor 304. In response, network control processor 304 sends a TERMINATE REQUEST message 2464 to operator console 308 to release operator console 308 from the conference call and free that operator console 308 for other uses. This results in network control processor 304 releasing operator console 308 from the conference call, as illustrated in a step 2308.

In a step 2312, conference call controller 904 requests conference bridge 908 to disconnect the allocated operator console 308 from the conference call. In this step, conference call controller 904 is requesting that conference bridge 908 remove the operator port 1116 from the conference. In one embodiment, this is accomplished by conference call controller 904 sending a REMOVE REQUEST message 2468 to conference bridge 908.

In a step 2316, conference bridge 908 removes operator port 1116 from the conference.

As described above, if there are additional conference participants that still need to be called for the conference call and joined, the operation continues again at step 1908 in FIG. 19. This continues until all conference participants have been called and joined as appropriate. Once all the conference participants have been called, the conference is ready to begin.

In one embodiment, conference call controller 904 periodically adjusts the number of operator console allocations for the conference call. This can be accomplished by polling network control processor 304 to determine the number of consoles 308 logged in (active) and available to handle calls with the appropriate network control processor call type, device type, and language. If an operator console 308 is available to handle the conference call, conference call controller 904 allocates this console 308, so that the operator can begin calling participants. If additional operator consoles 308 are available, more than one operator console 308 can be allocated to the conference call so that two or more of the participants can be contacted simultaneously. This assumes that there are a sufficient number of conference ports 1116 available to place these calls.

In one embodiment, polling process includes conference call controller 904 sending a DEVICE THRESHOLD REQUEST message 2472 to network control processor 304 to determine the number of available operator consoles 308 at the time. If there are no operator consoles 308 immediately available at the time the conference call is scheduled to be set up, the conference call is placed on the queue and an operator console 308 is allocated in due course.

2.3 Operator Assistance

During the course of a conference call, one or more conference participants may decide that operator assistance is required. One example of when operator assistance would be required is where the conference participants of an existing conference wish to add one or more additional conference participants to the existing conference. When a scenario such as this occurs, an operator console 308 can be provided to assist the conference call. Preferably, a human operator at a manual operator console 332 is used to converse with the conference participants to determine their needs. Alternatively, an automated voice response unit 334 can provide a scripted menu to the conference participants from which they can select the features or functions they would like operator console 308 to perform.

Figure 25:
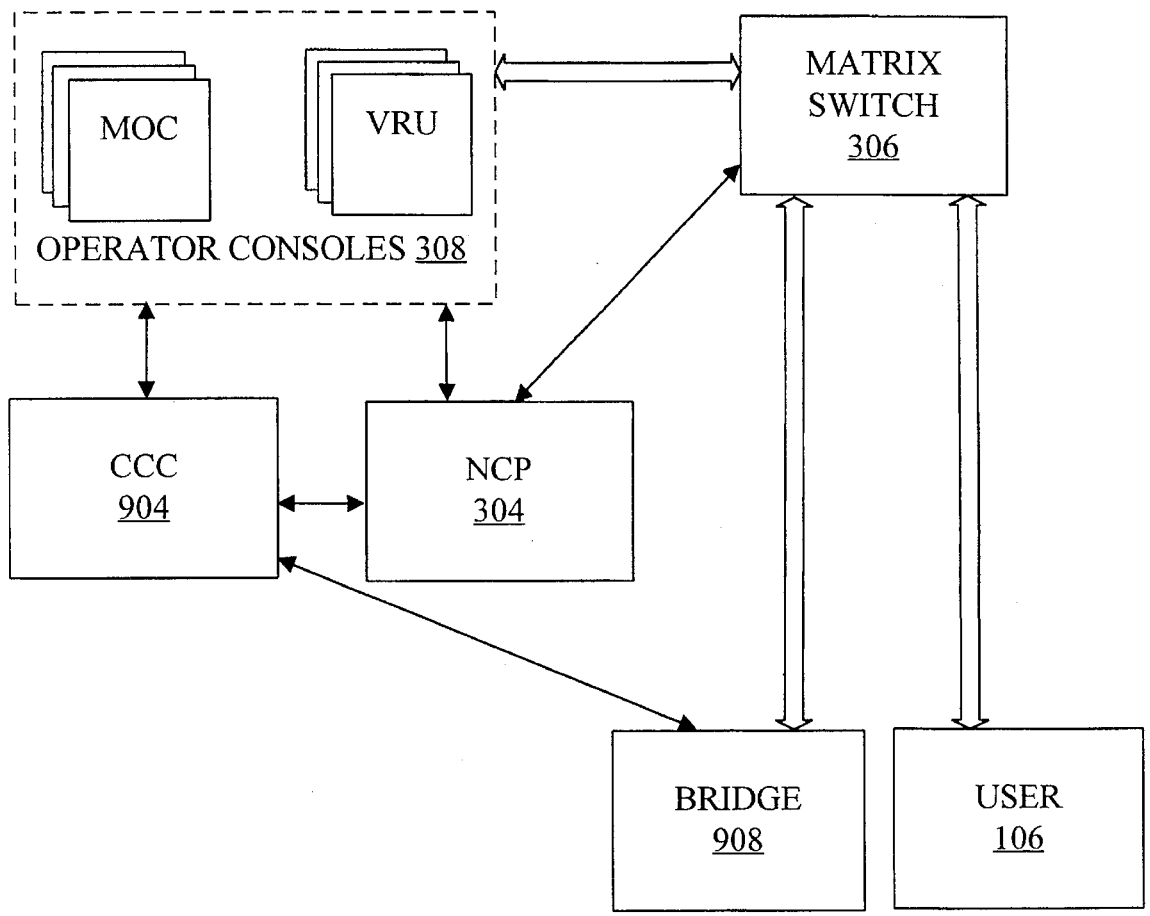
FIG. 25 is a block diagram illustrating the components utilized to provide operator assistance to an existing conference call.

FIG. 25 is a block diagram illustrating the components utilized to provide operator assistance to an existing conference call. These components include conference call controller 904, conference bridge 908, network control processor 304, matrix switch 306, and an operator console 308.

Figure 26:
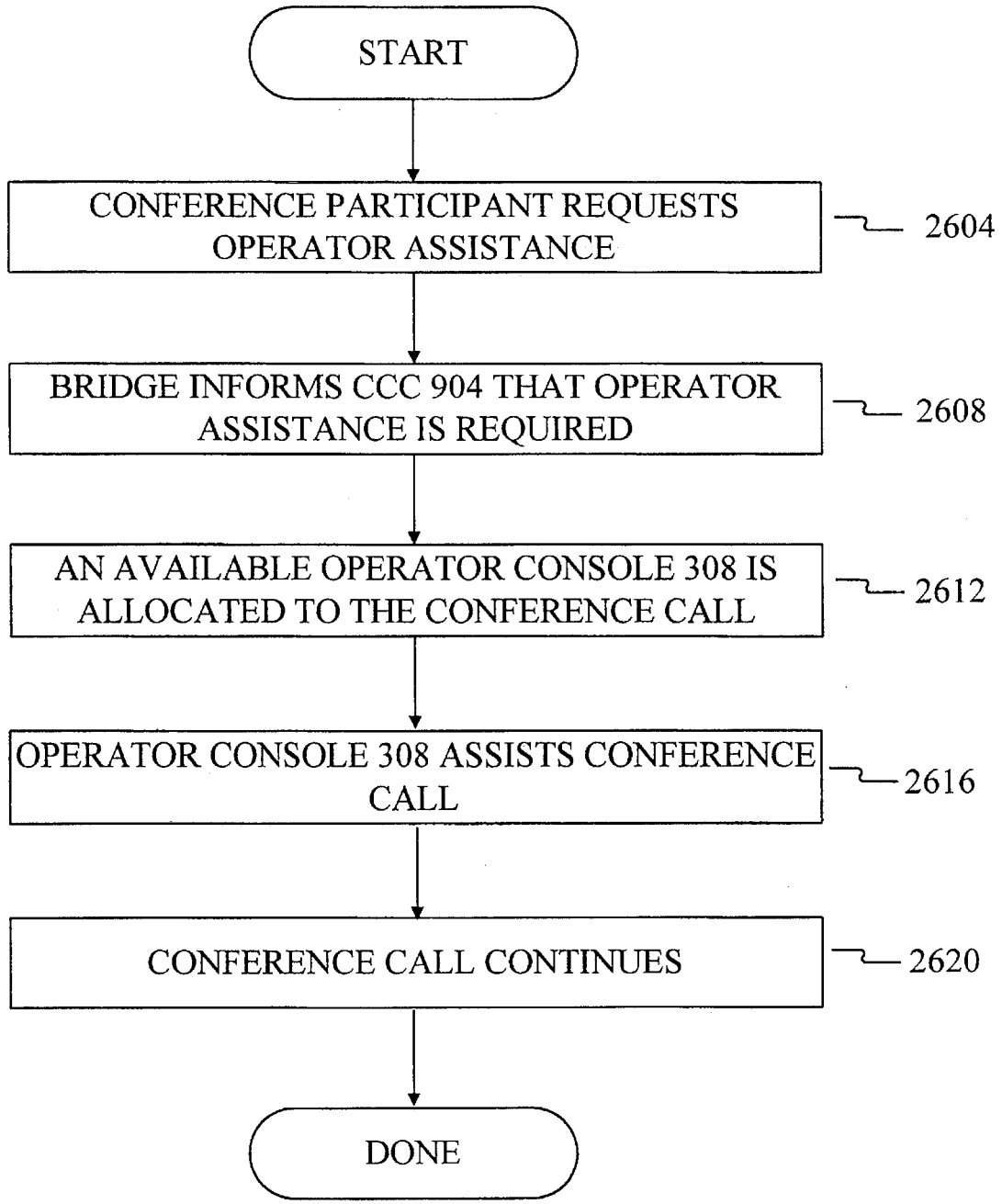
FIG. 26 is an operational flow diagram illustrating the steps associated with providing operator assistance to an existing conference call.
Figure 29:
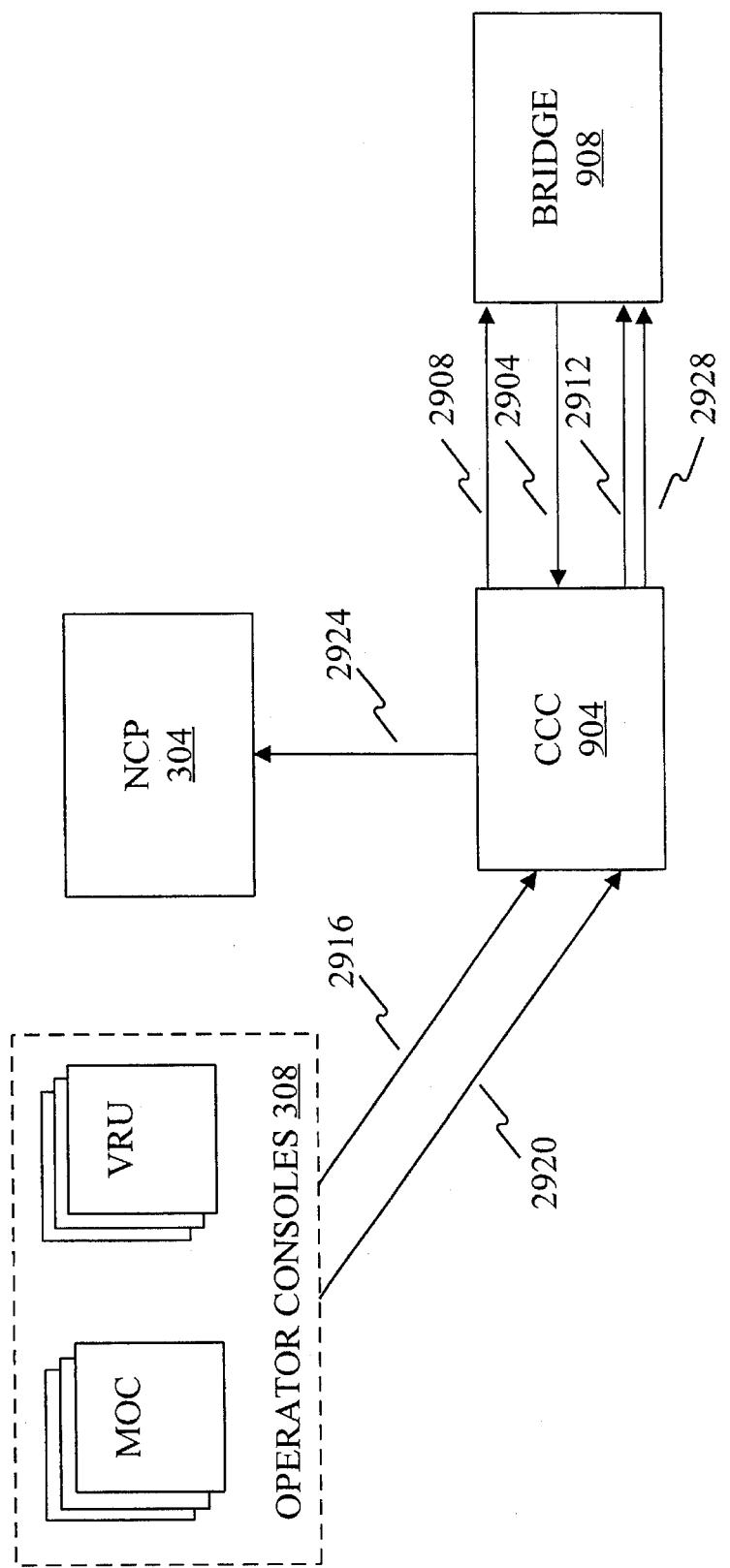
FIG. 29 is a data flow diagram illustrating the message traffic associated with providing operator assistance to a conference call.

FIG. 26 is an operational flow diagram illustrating the steps associated with providing operator assistance to an existing conference call. FIG. 29 is a data flow diagram illustrating the message traffic associated with providing operator assistance to a conference call. Referring now to FIGS. 25, 26 and 29, in a step 2604, a conference participant (labeled as user 106) requests operator assistance. One way this is accomplished is by pressing the operator assistance key (e.g., the 'numeral 0' key) on his or her telephone keypad. The depression of this key during a conference call causes conference call controller 904 to invoke operator assistance. In one embodiment, when the '0' key is pressed, conference bridge 908 sends a DTMF DETECT REQUEST message 2904 to conference call controller 904. The DTMF (dual-tone multifrequency) tone is recognized by a DSP 1108 that is processing the conference call.

Upon receipt of the request for operator assistance, conference bridge 908 informs conference call controller 904 that operator assistance is requested. This occurs in a step 2608. In response, conference call controller 904 requests that an operator console 308 be allocated to the conference call. Allocation of an operator console 308 is described above with reference to FIG. 21.

In a step 2612, an available operator console 308 is allocated to provide operator assistance to the conference call. Once allocated, in a step 2616, the operator console 308 assists the conference call as requested by the conference participants. When operator assistance is no longer required, the operator console 308 is de-allocated and the conference call continues as illustrated by step 2620.

Figure 27:
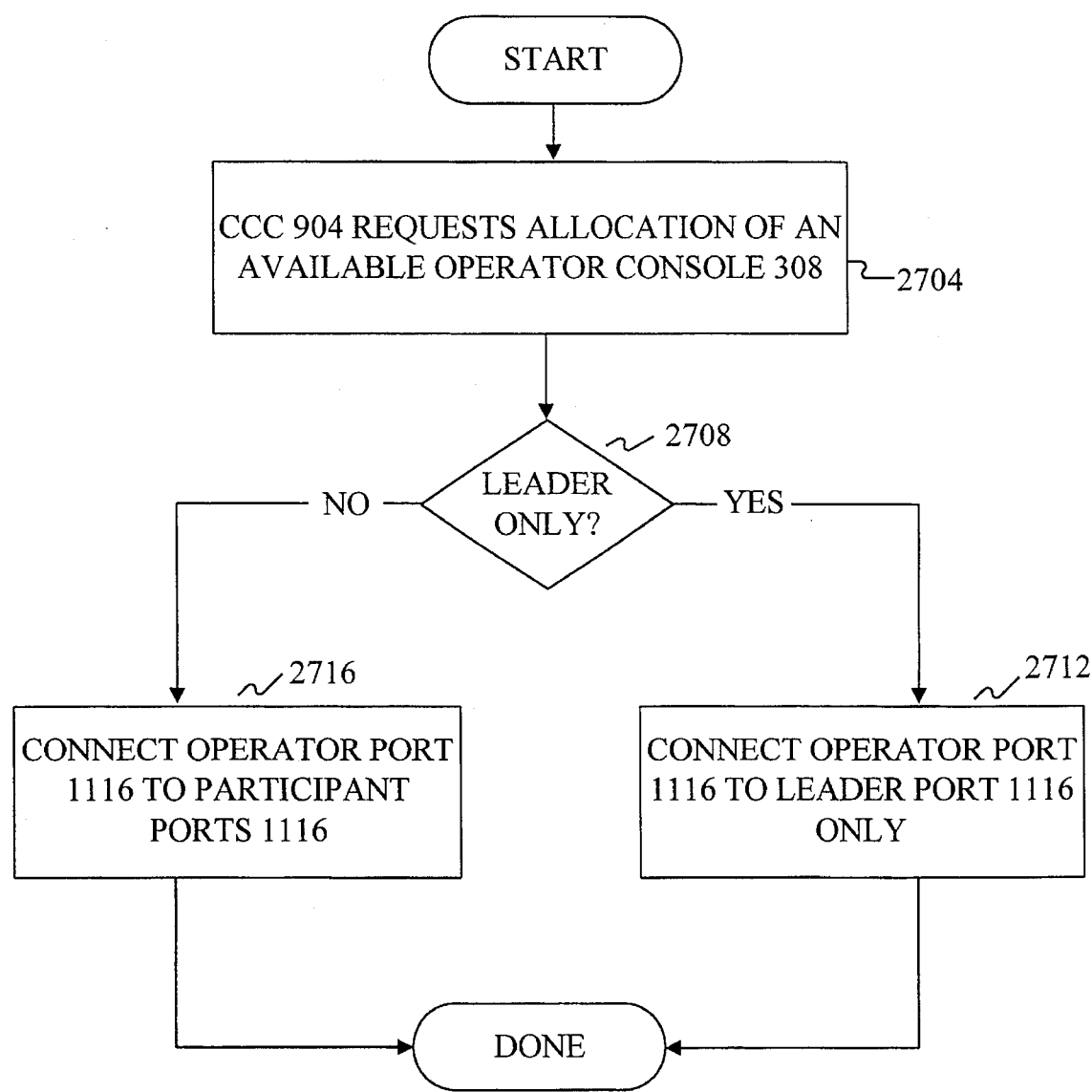
FIG. 27 is an operational flow diagram illustrating the allocation and connection of operator console to the conference call.

As discussed above with reference to FIG. 26, an available operator console is allocated to handle the conference call when requested. FIG. 27 is an operational flow diagram illustrating the allocation and connection of operator console 308 to the conference call. Referring now to FIG. 27, in a step 2704, conference call controller 904 requests allocation of an available operator console. This is discussed in detail above with reference to steps 2104 and 2108 of FIG. 21. To briefly recapitulate, conference call controller 904 requests that network control processor 304 allocate an available operator console 308 to the conference call. In response, network control processor 304 connects an available operator console 308 to an available conference port 1116 (referred to as operator port 1116 for ease of discussion) at conference bridge 908.

In a step 2708, conference call controller 904 determines whether the conference is configured to allow only the leader to control the operator assistance or whether the assistance can be provided to all conference participants. If assistance is to be provided to only the leader, the conference call controller instructs conference bridge 908 to connect operator port 1116 to the leader's conference port 1116 only. In response, conference bridge 908 connects operator port 1116 to the leader's conference port 1116. This is illustrated in a step 2712. In one embodiment, this is performed by conference call controller 904 sending a CONNECT message 2908 to conference bridge 908 connecting the operator port 1116 to the leader's conference port 1116.

If, on the other hand, assistance is to be provided to all participants, operator port 1116 is connected to all conference ports 1116 for the conference as shown by a step 2716. In other words, the operator console 308 is conferenced into the conference call.

For step 2716, conference call controller 904 sends an ADD REQUEST message 2912 to conference bridge 908 to add operator console 308 to the conference call.

At this time, operator console 308 is connected to one or more of the conference participants who can request that it provide specific assistance as stated in step 2616 of FIG. 26.

Figure 28:
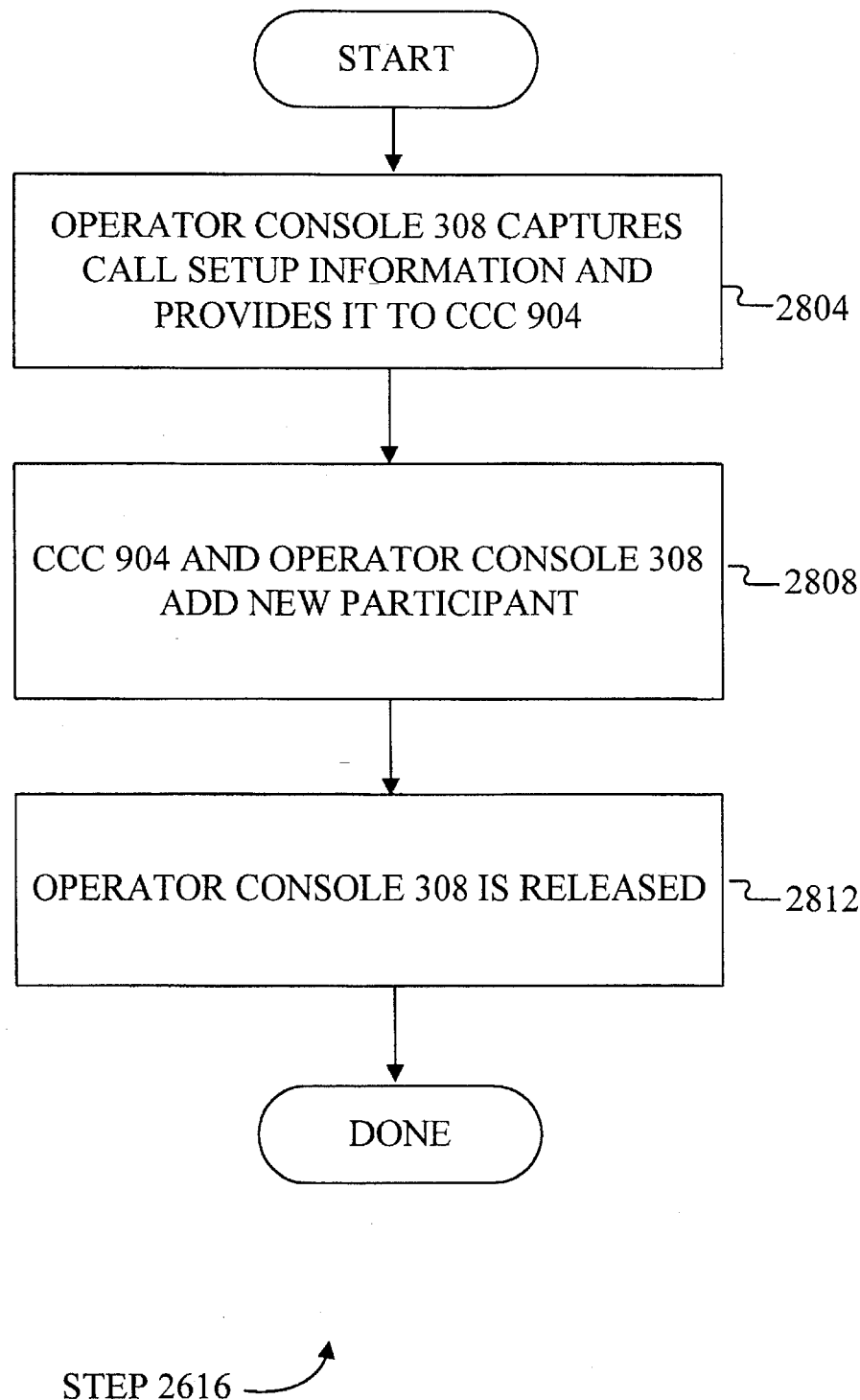
FIG. 28 is an operational flow diagram illustrating the steps of adding an additional participant to the conference.

To better illustrate how an operator console 308 can assist the conference call, an example scenario is now described. In this scenario, the existing conference participants determine that they would like to add an additional participant to the conference. This scenario is illustrated in FIG. 28. Referring now to FIGS. 25, 28 and 29, in a step 2804 the allocated operator console 308 captures the appropriate call setup information from the conference participants (or from the leader only) and provides this information to conference call controller 904. In one embodiment, this is accomplished by asking the conference participant the name and number of the additional participant to be added. Operator console 308 sends a SETUP REQUEST message 2920 to conference call controller 904 providing the pertinent call setup information to conference call controller 904.

In a step 2808, conference call controller 904 and any available operator console 308 add the additional conference participant to the existing conference. The process of adding a conference participant to the conference is similar to originating a conference participant for the conference and connecting that conference participant to the conference bridge 908 as discussed above in step 1912 and more specifically with respect to FIG. 22.

While conference call controller 904 is in the process of originating a call to the additional conference participant, the allocated operator console 308 is available to provide additional assistance to the conference. The operator can provide a conference status (including a list of present conference participants), add an additional conference participant, remove a conference participant, or cancel the conference. When operator console 308 has finished assisting the conference call, an ACTION COMPLETE REQUEST message 2916 is sent to conference call controller 904.

In a step 2812, the allocated operator console 308 is released. In one embodiment, this is accomplished by sending a RELEASE REQUEST message 2924 to network control processor 304 to free the operator console. Once this is accomplished, conference call controller 904 sends a REMOVE REQUEST message 2928 to conference bridge 908. This removes the operator console port from the conference, releasing its access to the conference.

2.4 Conference Call Completion Phase

When the conference call is completed and conference participants begin hanging up their phones, the system must take steps necessary to clear artifacts of the conference so that resources are available for future conferences. This takes place in the conference call completion phase.

Figure 30:
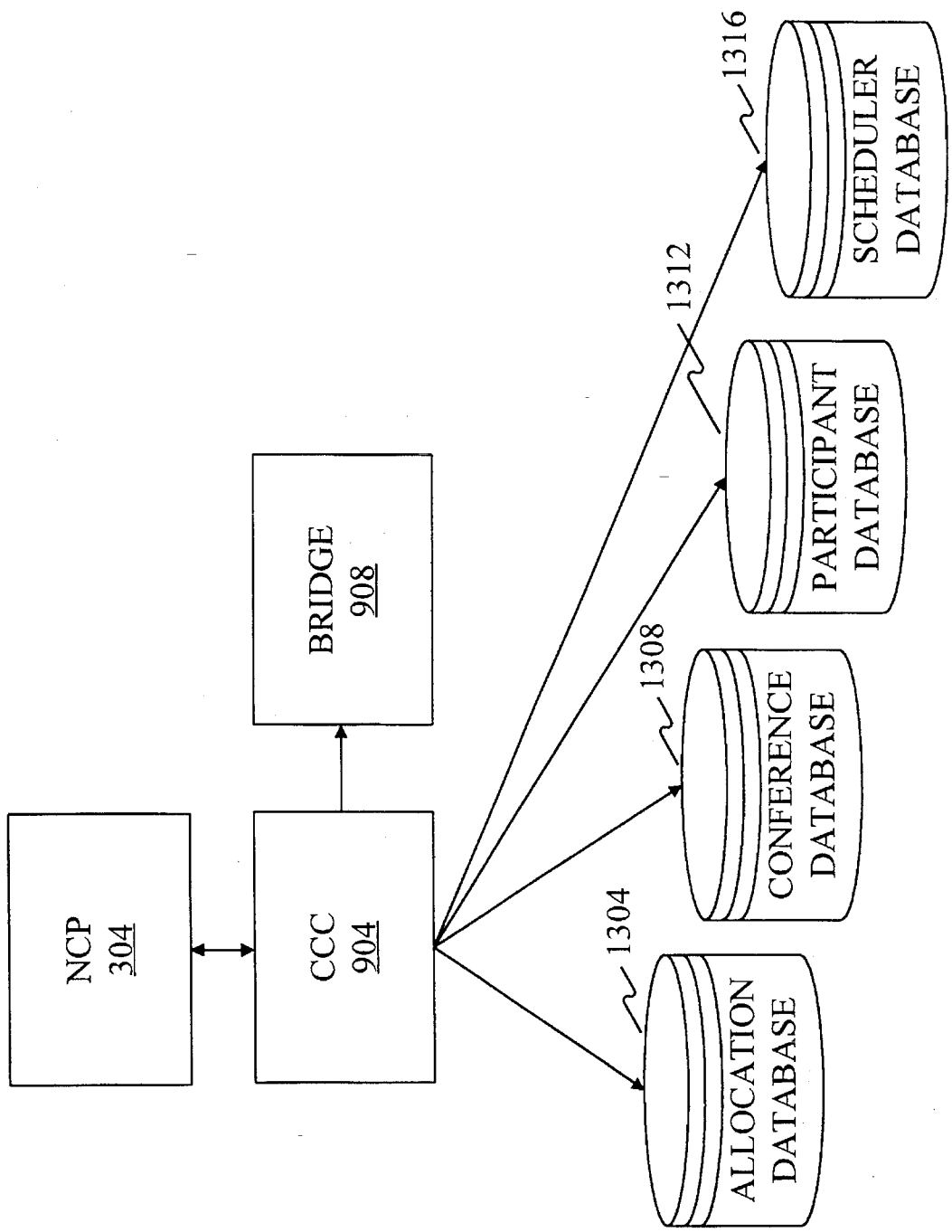
FIG. 30 is a block diagram illustrating the components utilized during the completion phase of a conference call.
Figure 31:
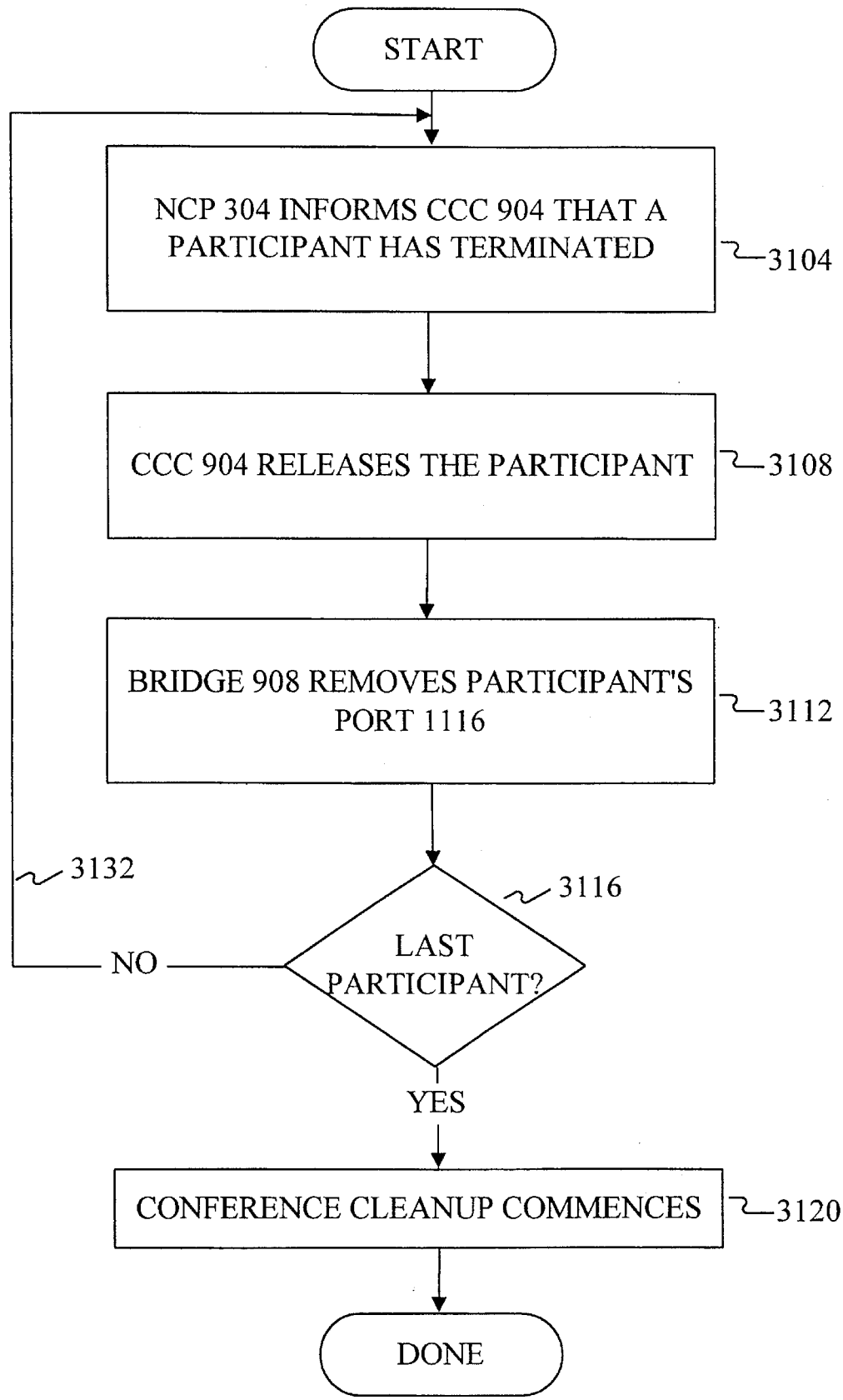
FIG. 31 is an operational flow diagram illustrating the steps associated with the completion phase of a conference call.
Figure 32:
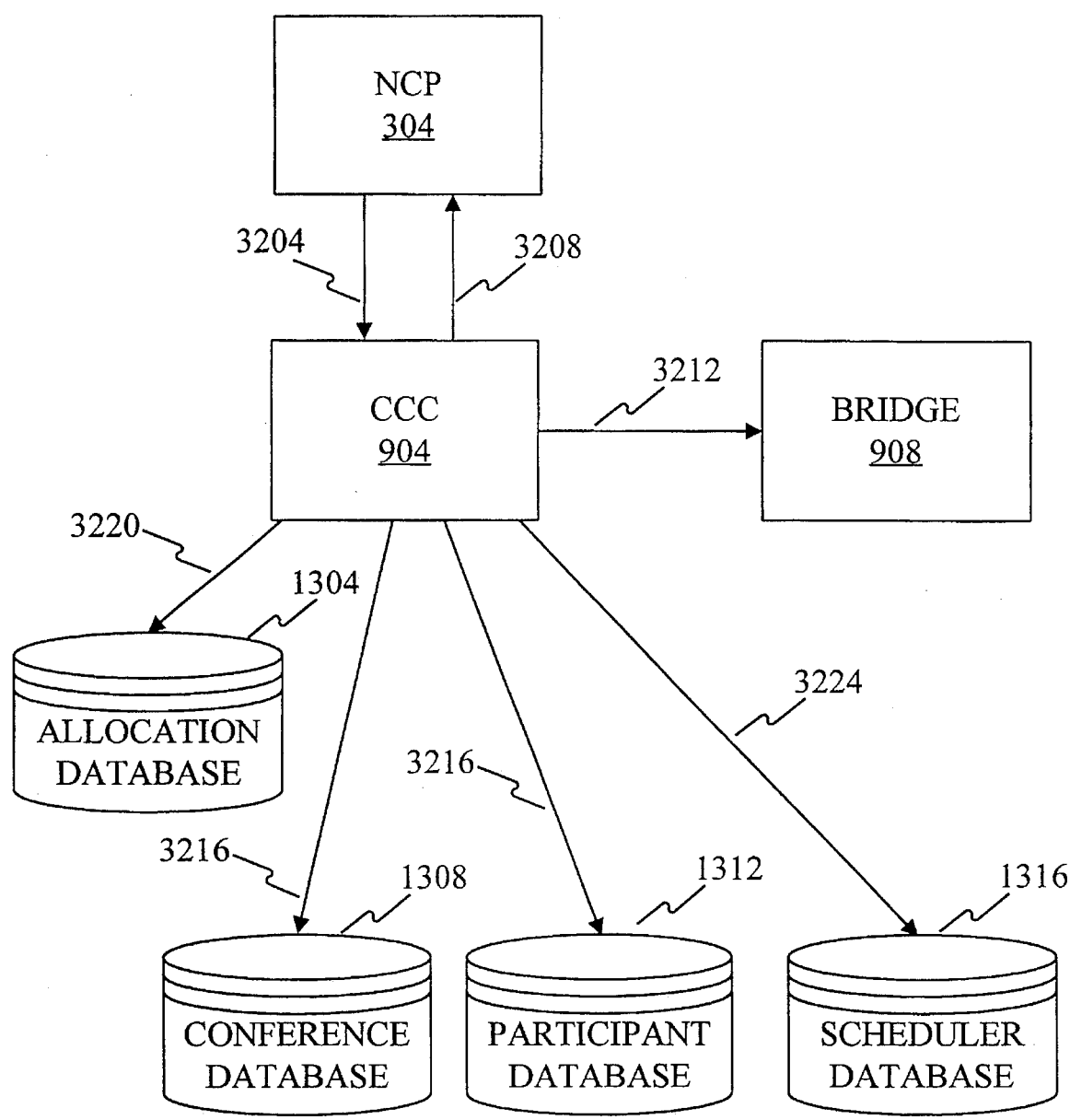
FIG. 32 is a data flow diagram illustrating the messages utilized during the completion phase of a conference call.

FIG. 30 is a block diagram illustrating the components utilized during the completion phase of a conference call. These components include conference call controller 904, network control processor 304, conference bridge 908, allocation database 1304, conference database 1308, participant database 1312, and scheduler database 1316. FIG. 31 is an operational flow diagram illustrating the steps associated with the completion phase of a conference call. FIG. 32 is a data flow diagram illustrating the messages utilized during the completion phase of a conference call.

Referring now to FIGS. 30, 31 and 32, the completion phase of a conference call is now described. In a step 3104, network control processor 304 informs conference call controller 904 that a conference participant has exited from the conference call (i.e., the conference participant hung up his or her phone). In one embodiment, network control processor 304 sends a TERMINATE REQUEST message 3204 to conference call controller 904.

In a stop 3108, conference call controller 904 releases the conference participant from the conference call. In one embodiment, this is accomplished by sending a RELEASE REQUEST message 3208 from conference call controller 904 to network control processor 304. Also, conference call controller 904 sends a REMOVE REQUEST message 3212 to conference bridge 908.

In a step 3112, conference bridge 908 removes that participant's conference port 1116 from the conference. Steps 3104 through 3112 are repeated for each conference participant that hangs up, as illustrated by flow line 3132. Once the last conference participant has terminated from the conference call (as illustrated by step 3116), conference cleanup commences in a step 3120. During conference cleanup, conference call controller deletes the conference information from conference database 1308 and conference participant information from conference participant database 1312. This is accomplished by sending a DELETE REQUEST message 3216 to each of these databases.

Finally, conference call controller 904 releases any resources that have been allocated to the terminated conference call. In one embodiment, this is accomplished via these steps: First, in one embodiment, conference call controller 904 performs a search of allocation database 1304 and overwrites the old values with the new ones. An UPDATE REQUEST message 3220 is sent to allocation database 1304. This instructs allocation database 1304 to de-allocate the resources that were allocated to that conference. Second, conference call controller 904 removes the call processing event for this scheduled conference call by sending a REMOVE EVENT REQUEST message 3224 to scheduler database 1316.

3.0 Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for setting up a conference call among a plurality of conference participants, comprising the steps of:
   (a) receiving a request from a user to set up a conference call;
   (b) allocating resources in a conference bridge to said conference call based on said request;
   (c) initiating said conference call on said conference bridge, wherein said step of initiating comprises the steps of:
      (1) originating a call to a prospective conference participant, wherein an operator console is connected to a first port on said conference bridge and said prospective conference participant is connected to a second port on said conference bridge, said first and second ports being connected; and
      (2) connecting said prospective conference participant to said conference call on said conference bridge if said prospective conference participant informs an operator at said operator console that said prospective conference participant desires to participate in said conference call.

2. The method of claim 1, wherein said step (b) comprises the steps of:
   i. receiving schedule information regarding a scheduled time and the number of participants for the conference call;
   ii. examining resource availability at said scheduled time to determine whether resources required to support the conference call at the scheduled time are available; and
   iii. reserving said required resources for the conference call.

3. The method of claim 2, wherein said step (b) further comprises the steps of:
   iv. receiving participant information for the conference call; and
   v. storing said participant information in a participant database.

4. The method of claim 3, further comprising a step (d) of connecting an operator console to the conference call to provide operator assistance in response to a request by a conference participant.

5. The method of claim 4, wherein said step (d) comprises the steps of:
   i. receiving a request for operator assistance from a conference participant;
   ii. connecting an operator console to an available port on said bridge; and
   iii. connecting said available port to the conference call.

6. The method of claim 5, further comprising the step of adding an additional conference participant, wherein said step of adding an additional conference participant comprises the steps of:
   i. capturing call setup information for the additional participant;
   ii. originating a call to the additional participant and connecting the additional participant to an available port on said bridge; and
   iii. connecting said available port to the conference call.

7. The method of claim 1, wherein said step (b) comprises the steps of:
   an operator console querying said user for schedule information regarding a scheduled time;
   said operator console sending said schedule information to a conference call controller;
   said conference call controller determining which resources are required to support the conference call and querying an allocation database to determine whether said required resources are available at said scheduled time; and
   updating said allocation database to indicate that said required resources are reserved for the conference call.

8. The method of claim 7, wherein said step of querying further comprises the step of providing scripted text to said operator console.

9. The method of claim 7, further comprising the step of storing conference information in a conference database, wherein said conference information comprises said scheduled time and said required resources.

10. The method of claim 9, further comprising the step of deleting said conference information from said conference database when the conference call is completed.

11. The method of claim 1, wherein said step (c)(1) comprises the steps of:
    allocating an operator console to the conference call and connecting said operator console to a first port on a bridge;
    ii. originating a call to a conference participant and connecting call audio of said conference participant to a second port on said bridge;
    iii. connecting said first and second ports; and
    iv. informing said conference participant that said conference participant will be joining the conference call.

12. The method of claim 11, wherein said step (c)(2) comprises the steps of:
    v. said operator console informing a conference call controller that said conference participant is joining the conference call; and
    vi. said conference call controller instructing said bridge to connect said second port to ports of participants in the conference call.

13. The method of claim 11, wherein said step (c)(1) further comprises the steps of:
    v. retrieving participant information from a participant database for the conference call; and
    vi. allocating ports on said bridge as conference ports.

14. A system for connecting a plurality of prospective participants in a conference call, comprising:
    a bridge having a plurality of ports; and
    a conference call controller coupled to said bridge, said conference call controller comprising:
       means for allocating resources of said bridge to the conference call;

means for originating a call to a prospective conference participant, wherein an operator console is connected to a first port on said bridge and said prospective conference participant is connected to a second port on said bridge, said first and second ports being connected; and means for connecting said prospective conference participant to an existing conference call on said bridge, if said prospective conference participant informs an operator at said operator console that said prospective conference participant desires to participate in said conference call.

15. The system of claim 14, wherein said bridge further comprises a digital signal processor for recognizing and generating tone-based messages.

16. The system of claim 14, wherein said means for allocating, comprises:

means for receiving schedule information regarding a scheduled time and the number of participants for the conference call;

means for determining which of said bridge resources are resources required to handle the conference call, said determination based on said schedule information;

means for examining availability of said bridge resources to determine whether said required bridge resources are available at the scheduled time; and means for reserving said required resources for the conference call.

17. The system of claim 16, wherein said conference call controller further comprises:

means for receiving participant information for the conference call; and means for storing said participant information in a participant database.

18. The system of claim 16, wherein said means for examining availability of said bridge resources further comprises means for querying an allocation database to determine whether said required resources are available at said scheduled time, and said means for reserving said required resources comprises means for updating said allocation database to indicate that said required resources are reserved for the conference call.

19. The system of claim 16, further comprising an operator console coupled to said conference call controller, wherein said operator console comprises:

means for querying said user for said schedule information; and means for forwarding said schedule information to said conference call controller.

20. The system of claim 19, wherein means for querying further comprises means for querying said user using scripted text.

21. The system of claim 16, wherein said conference call controller further comprises means for storing conference information in a conference database, wherein said conference information comprises said scheduled time and said required resources.

22. The system of claim 21, wherein said conference call controller further comprises means for deleting said conference information from said conference database when the conference call is completed.

23. The system of claim 14, wherein said means for originating a call to each of said conference participants comprises:

means for allocating an operator console to the conference call and connecting said operator console to a first conference port;

means for originating a call to a conference participant and connecting call audio of said conference participant to a second conference port on said bridge; and means for instructing said bridge to connect said first and second ports so that said operator console can inform said conference participant that the conference call is beginning.

24. The system of claim 23, wherein said conference call controller further comprises:

means for retrieving participant information from a participant database for the conference call; and means for allocating ports on said bridge as conference ports.

25. The system of claim 23, wherein said conference call controller further comprises means for connecting an operator console to the conference call to provide operator assistance in response to a request by a conference participant.

26. The system of claim 25, wherein said means for connecting an operator console comprises:

means for receiving a request for operator assistance from a conference participant;

means for connecting said operator console to an available port on said bridge; and means for connecting said available port to the conference call.

27. The system of claim 26, wherein said conference call controller further comprises means for adding a conference participant, wherein said means for adding a conference participant comprises:

means for capturing call setup information for the additional participant;

means for originating a call to the additional participant via an available port on said bridge; and means for connecting said available port to the conference call.

28. A method for setting up a conference call among a plurality of conference participants, comprising the steps of:

(a) receiving a request from a user to set up the conference call;

(b) allocating resources in a conference bridge to the conference call based on said request;

(c) initiating the conference call on said conference bridge by simultaneously originating a telephone call to each of a plurality of prospective conference participants, wherein each of said prospective conference participants is connected to a separate port on said conference bridge; and (d) connecting said separate ports of said prospective conference participants that are willing to participate in the conference call.

29. The method of claim 28, wherein said step (b) comprises the steps of:

i. receiving schedule information regarding a scheduled time and the number of participants for the conference call;

ii. examining resource availability at said scheduled time to determine whether resources required to support the conference call at the scheduled time are available; and iii. reserving said required resources for the conference call.

30. The method of claim 29, wherein said step (b) further comprises the steps of:

iv. receiving participant information for the conference call; and v. storing said participant information in a participant database.

31. The method of claim 28, wherein said step (b) comprises the steps of:
   an operator console querying said user for said scheduling information;
   said operator console sending said schedule information to a conference call controller;
   said conference call controller determining which resources are required to support the conference call and querying an allocation database to determine whether said required resources are available at said scheduled time; and
   updating said allocation database to indicate that said required resources are reserved for the conference call.

32. The method of claim 31, wherein said step of querying further comprises the step of providing scripted text to said operator console.

33. The method of claim 31, wherein said step (b) further comprises the step of storing conference information in a conference database, wherein said conference information comprises said scheduled time and said required resources.

34. The method of claim 33, further comprising the step of deleting said conference information from said conference database when the conference call is completed.

35. The method of claim 28, wherein said step (c) comprises the steps of:
   allocating a plurality of operator consoles to the conference call and for each one of said plurality of operator consoles performing the following steps:
   i. connecting an operator console to a first available port on a bridge;
   ii. originating a call to a conference participant and connecting call audio of said conference participant to a second available port on said bridge;
   iii. connecting said first and second available ports; and
   iv. informing said conference participant that said conference participant will be joining the conference call.

36. The method of claim 35, wherein said step (c) further comprises the steps of:
   v. retrieving participant information from a participant database for the conference call; and
   vi. allocating ports on said bridge as conference ports.

37. The method of claim 35, wherein said step (d) comprises the step of connecting said second port to the conference call.

38. The method of claim 37, wherein said step (d) comprises the steps of:
   v. said operator console informing a conference call controller that said conference participant is joining the conference call; and
   vi. said conference call controller instructing said bridge to connect said second port to ports of participants in the conference call.

39. The method of claim 35, further comprising a step (e) of connecting an operator console to the conference call to provide operator assistance in response to a request by a conference participant.

40. The method of claim 39, wherein said step (e) comprises the steps of:
   i. receiving a request for operator assistance from a conference participant;
   ii. connecting an operator console to an available port on said bridge; and
   iii. connecting said available port to a conference port.

41. The method of claim 40, further comprising the step of adding an additional conference participant, wherein said step of adding an additional conference participant comprises the steps of:
   i. capturing call setup information for the additional participant;
   ii. originating a call to the additional participant and connecting the additional participant to a first port on said bridge; and
   iii. connecting said first port to said participant ports.

42. A method for adding a conference participant to an existing conference call on a conference bridge, comprising the steps of:
   (a) originating a call to a prospective conference participant, wherein an operator console is connected to a first port on said conference bridge and said prospective conference participant is connected to a second port on said conference bridge, said first and second ports being connected; and
   (b) connecting said prospective conference participant to an existing conference call on said bridge, if said prospective conference participant informs an operator at said operator console that said prospective conference participant desires to participate in said conference call.

43. The method of claim 42, wherein said step (a) comprises the steps of:
   i. allocating an operator console to the conference call and connecting said operator console to a first port on a bridge;
   ii. originating a call to a conference participant and connecting call audio of said conference participant to a second port on said bridge;
   iii. connecting said first and second ports; and
   iv. informing said conference participant that said conference participant will be joining the conference call.

44. The method of claim 43, wherein said step (b) comprises the steps of:
   v. said operator console informing a conference call controller that said conference participant is joining the conference call; and
   vi. said conference call controller instructing said bridge to connect said second port to said existing conference call.

45. A system for connecting a conference participant to an existing conference call, comprising:
   a bridge having a plurality of ports, said bridge supporting the existing conference call; and
   a conference call controller coupled to said bridge, said conference call controller comprising:
      means for originating a call to a prospective conference participant, wherein an operator console is connected to a first port on said bridge and said prospective conference participant is connected to a second port on said bridge, said first and second ports being connected; and
      means for connecting said prospective conference participant to the existing conference call on said bridge, if said prospective conference participant informs an operator at said operator console that said prospective conference participant desires to participate in said conference call.

46. The system of claim 45, wherein said means for originating a call a prospective conference participant comprises:

means for allocating an operator console to the conference call and connecting said operator console to a first conference port;

means for originating a call to a conference participant and connecting call audio of said conference participant to a second conference port on said bridge; and means for instructing said bridge to connect said first and second ports so that said operator console can inform said conference participant that the conference call is beginning.

* * * * *